(12) United States Patent
Duggal et al.

(10) Patent No.: US 11,200,062 B2
(45) Date of Patent: Dec. 14, 2021

(54) HISTORY FILE FOR PREVIOUS REGISTER MAPPING STORAGE AND LAST REFERENCE INDICATION

(71) Applicant: Apple Inc., Cupertino, CA (US)

(72) Inventors: Deepankar Duggal, Sunnyvale, CA (US); Conrado Blasco, Sunnyvale, CA (US); Muawya M. Al-Otoom, Pleasanton, CA (US); Richard F. Russo, San Jose, CA (US)

(73) Assignee: Apple Inc., Cupertino, CA (US)

( * ) Notice: Subject to any disclaimer, the term of this patent is extended or adjusted under 35 U.S.C. 154(b) by 91 days.

(21) Appl. No.: 16/551,208

(22) Filed: Aug. 26, 2019

(65) Prior Publication Data

US 2021/0064376 A1   Mar. 4, 2021

(51) Int. Cl.
*G06F 9/38*   (2018.01)

(52) U.S. Cl.
CPC ............ *G06F 9/384* (2013.01); *G06F 9/3861* (2013.01); *G06F 9/3863* (2013.01)

(58) Field of Classification Search
CPC ...... G06F 9/384; G06F 9/3842; G06F 9/3861; G06F 9/3863
See application file for complete search history.

(56) References Cited

U.S. PATENT DOCUMENTS

| | | |
|---|---|---|
| 5,630,149 A | 5/1997 | Bluhm |
| 5,655,096 A | 8/1997 | Branigin |

(Continued)

FOREIGN PATENT DOCUMENTS

| | | |
|---|---|---|
| EP | 0297265 A2 | 1/1989 |
| JP | 2000181715 A | 6/2000 |

(Continued)

OTHER PUBLICATIONS

Jourdan, et al., "A Novel Renaming Scheme to Exploit Value Temporal Locality through Physical Register Reuse and Unification" Proceedings of the 31st Annual ACM/IEEE International Symposium on Microarchitecture, Nov. 1, 1998, 10 pages, IEEE Computer Society Press, Los Alamitos, CA, USA.

(Continued)

*Primary Examiner* — David J. Huisman
(74) *Attorney, Agent, or Firm* — Kowert Hood Munyon Rankin and Goetzel PC; Rory D. Rankin

(57) ABSTRACT

Systems, apparatuses, and methods for implementing a physical register last reference scheme are described. A system includes a processor with a mapper, history file, and freelist. When an entry in the mapper is updated with a new architectural register-to-physical register mapping, the processor creates a new history file entry for the given instruction that caused the update. The processor also searches the mapper to determine if the old physical register that was previously stored in the mapper entry is referenced by any other mapper entries. If there are no other mapper entries that reference this old physical register, then a last reference indicator is stored in the new history file entry. When the given instruction retires, the processor checks the last reference indicator in the history file entry to determine whether the old physical register can be returned to the freelist of available physical registers.

20 Claims, 18 Drawing Sheets

(56) References Cited

U.S. PATENT DOCUMENTS

| | | | |
|---|---|---|---|
| 5,740,414 A * | 4/1998 | Tovey | G06F 9/3836 |
| | | | 712/233 |
| 5,751,983 A | 5/1998 | Abramson et al. | |
| 5,926,646 A | 7/1999 | Pickett et al. | |
| 6,047,369 A | 4/2000 | Colwell et al. | |
| 6,065,103 A | 5/2000 | Tran et al. | |
| 6,094,716 A | 7/2000 | Witt | |
| 6,122,656 A | 9/2000 | Witt | |
| 6,122,725 A | 9/2000 | Roussel et al. | |
| 6,256,721 B1 | 7/2001 | Witt | |
| 6,505,293 B1 | 1/2003 | Jourdan et al. | |
| 6,560,671 B1 | 5/2003 | Samra et al. | |
| 6,594,754 B1 * | 7/2003 | Jourdan | G06F 9/384 |
| | | | 712/217 |
| 6,662,280 B1 | 12/2003 | Hughes | |
| 6,701,425 B1 | 3/2004 | Dabbagh et al. | |
| 7,263,600 B2 | 8/2007 | Sander et al. | |
| 7,467,239 B2 | 12/2008 | Nicolai et al. | |
| 9,575,754 B2 | 2/2017 | Keller et al. | |
| 2002/0087836 A1 * | 7/2002 | Jourdan | G06F 9/3857 |
| | | | 712/217 |
| 2004/0255101 A1 | 12/2004 | Filippo et al. | |
| 2005/0066131 A1 | 3/2005 | Biles et al. | |
| 2005/0091475 A1 | 4/2005 | Sodani | |
| 2005/0138338 A1 | 6/2005 | Sodani et al. | |
| 2008/0059770 A1 | 3/2008 | Garg et al. | |
| 2008/0215804 A1 | 9/2008 | Davis et al. | |
| 2010/0153690 A1 | 6/2010 | Vick et al. | |
| 2010/0299499 A1 | 11/2010 | Golla et al. | |
| 2011/0040955 A1 | 2/2011 | Hooker et al. | |
| 2011/0238962 A1 * | 9/2011 | Cain, III | G06F 9/384 |
| | | | 712/228 |
| 2011/0320785 A1 | 12/2011 | Chen et al. | |
| 2012/0005459 A1 | 1/2012 | Fleischman et al. | |
| 2013/0297912 A1 | 11/2013 | Tran et al. | |
| 2013/0339671 A1 | 12/2013 | Williams, III et al. | |
| 2014/0095838 A1 * | 4/2014 | Kadgi | G06F 9/30181 |
| | | | 712/220 |
| 2014/0189324 A1 * | 7/2014 | Combs | G06F 9/30181 |
| | | | 712/225 |
| 2016/0026463 A1 * | 1/2016 | Sundar | G06F 9/30181 |
| | | | 712/208 |

FOREIGN PATENT DOCUMENTS

| | | |
|---|---|---|
| JP | 2005532613 A | 10/2005 |
| JP | 2007503661 A | 2/2007 |
| JP | 2007536626 A | 12/2007 |
| WO | 2003093982 A1 | 11/2003 |
| WO | 2005111794 A1 | 11/2005 |
| WO | 2009129052 A1 | 10/2009 |

OTHER PUBLICATIONS

International Search Report and Written Opinion in International Application No. PCT/US2013/043318 dated Dec. 16, 2013, 11 pages.

Extended European Search Report in European Application No. 13170357.1, dated Jun. 24, 2014, 6 pages.

Akkary, Haitham, et al. "An Analysis of a Resource Efficient Checkpoint Architecture", ACM Transactions on Architecture and Code Optimization, Dec. 2004, pp. 418-444, vol. 1, No. 4, New York, USA.

Notice of Preliminary Rejection in Korean Patent Application No. 10-2013-68008, dated Aug. 18, 2014, 11 pages.

Office Action in Japanese Patent Application No. 2013-125333, dated Oct. 20, 2014, 8 pages.

Office Action in Taiwan Patent Application No. 102120951, dated Mar. 17, 2015, 11 pages.

Final Office Action in Japanese Patent Application No. 2013-125333, dated Jun. 29, 2015, 5 pages.

Decision of Grant in Japanese Patent Application No. 2013-125333, dated Feb. 1, 2016, 3 pages.

Notification of the First Office Action in Chinese Application No. 201310236291.X, dated Jan. 25, 2016, 19 pages.

Notification of the Second Office Action in Chinese Application No. 201310236291.X, dated Sep. 7, 2016, 18 pages.

Kanter, David, "Intels Sandy Bridge Microarchitecture", Real World Technologies, Sep. 25, 2010, http://www.realworldtech.com/sandy-bridge/, 25 pages. [Retrieved May 14, 2015].

* cited by examiner

HISTORY FILE FOR PREVIOUS REGISTER MAPPING STORAGE AND LAST REFERENCE INDICATION

BACKGROUND

Technical Field

Embodiments described herein relate to the field of integrated circuits and, more particularly, to efficiently tracking physical register references in a processor pipeline.

Description of the Related Art

Modern microprocessors are designed to take advantage of instruction level parallelism (ILP) in source code. One technique for increasing ILP during execution involves register renaming. Register renaming involves mapping architectural registers which are specified in instructions to physical registers of the processor, with the physical registers accessed during execution of the instructions. Without register renaming, instructions that write to the same architectural register would have to be executed in order. However, with register renaming, the same architectural register can be mapped to different physical registers, allowing the instructions to be executed in a different order. In register renaming, there is an optimization called a zero-cycle move which is described in U.S. Pat. No. 9,575,754. As described therein, the latency of executing a move instruction may be largely eliminated by assigning a physical register associated with a source operand of the instruction to the destination operand of the instruction.

One example of a move instruction is the instruction "mv r1, r2" which moves the data referenced by register "r2" into register "r1". With register renaming, since architectural registers are being assigned to physical registers, two architectural registers can point (or be mapped) to the same physical register to implement the above move instruction using the zero-cycle move optimization. Accordingly, the data is contained in a physical register which is pointed to by two different references. In some cases, more than two different architectural registers can point to the same physical register.

A free list is a structure storing physical register identifiers that are available for mapping to software-visible architectural registers. When a destination operand is renamed, typically, a new physical register identifier from the free list is used. An array separate from the free list may be used for maintaining a count of the number of architectural registers mapped to each physical register. This array, which may be referred to as a register duplicate array, is also described in U.S. Pat. No. 9,575,754. The array may be accessed with a physical register identifier, such as a physical register identifier for a particular source operand of a qualifying move operation. To provide a quick lookup during a renaming pipeline stage, the array may be a content addressable memory (CAM). Each entry in the CAM may include an identifier of a particular physical register and a count of the number of duplicates associated with the particular physical register identifier. However, the circuitry for a CAM consumes an appreciable amount of power. The power consumption and latency of the capacitive word lines and corresponding word line buffers or drivers limit both the number of entries in the CAM and the size of each entry. Consequently, the number of physical register identifiers permitted to be duplicated at a given time, and a maximum count for a given physical register identifier, is limited. When these limits are reached, the latency of subsequent move operations is no longer reduced and performance decreases.

In view of the above, methods and mechanisms for efficiently managing register renaming are desired.

SUMMARY

Systems, apparatuses, and methods for implementing a physical register last reference scheme are contemplated. In various embodiments, a computing system includes a processor with a register rename unit. In one embodiment, the register rename unit includes a mapper that maps architectural registers to physical registers, history file, and freelist. When an entry in the mapper is updated with a new architectural register-to-physical register mapping that replaces a physical register identifier with a new physical register identifier, the processor creates a new history file entry for the instruction that caused the update. The processor also searches the mapper to determine if the physical register that was previously identified (the "old" physical register) in the mapper entry is referenced by any other mapper entries. If there are no other mapper entries that reference the previously stored physical register identifier (ID), then a last reference indicator is stored in the new history file entry. When the corresponding instruction retires, the processor checks the last reference indicator in the history file entry to determine whether the old physical register can be returned to the freelist of available physical registers.

These and other embodiments will be further appreciated upon reference to the following description and drawings.

BRIEF DESCRIPTION OF THE DRAWINGS

The above and further advantages of the methods and mechanisms may be better understood by referring to the following description in conjunction with the accompanying drawings, in which.

Figure 1:
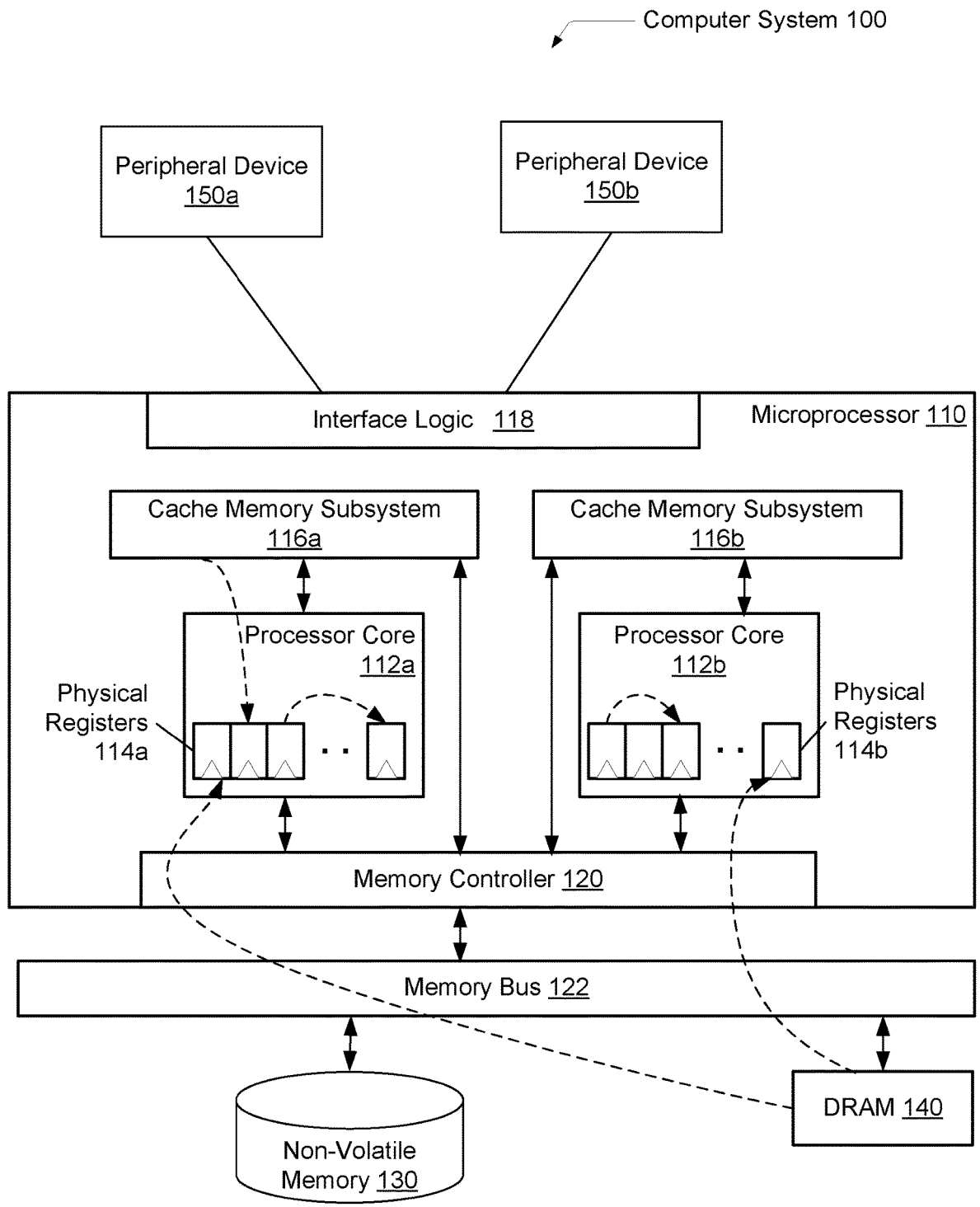
FIG. 1 is a generalized block diagram of one embodiment of a computer system.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Referring to FIG. 1, a generalized block diagram of one embodiment of a computer system 100 is shown. As shown, microprocessor 110 may be connected to one or more peripheral devices 150a-150b, and external computer memory, such as non-volatile memory 130 and dynamic random access memory (DRAM) 140. The non-volatile memory 130 may store an operating system (OS) for the computer system 100. Instructions of a software application may be loaded into one or more of the cache memory subsystems 116a-116b within the microprocessor 110. The software application may have been stored in one or more of the non-volatile memory 130, the DRAM 140 and one of the peripheral devices 150a-150b.

One or more of the processor cores 112a-112b may load the software application instructions from one of an associated cache memory subsystems 116a-116b and process the instructions. Generally speaking, when software programmers write applications to perform work according to an algorithm or a method, the programmers utilize variables to reference temporary and result data. This data utilizes space allocated in computer memory. The operating system allocates regions of memory for the software application.

During processing of the application, the data may be loaded from the allocated regions of memory into one or more of the cache memory subsystems 116a-116b. Subsequently, one or more of the physical registers 114a-114b within the processor cores 112a-112b are used to load and store the temporary and result data. In one implementation, the physical registers 114a-114b are assigned to architecturally visible registers that a software programmer and/or a compiler may identify within the software application. The architectural registers are associated with a given instruction set architecture (ISA). The hardware in the processor cores 112a-112b includes circuitry for processing instructions according to the given ISA. The hardware circuitry includes at least an associated set of physical registers 114a-114b, functional units, pipeline staging elements and control logic.

The given ISA may be used to select a manner for declaring and allocating regions of memory. The given ISA may further determine a selected addressing mode used to transfer data between the microprocessor 110, including the physical registers 114a-114b, and memory locations in one or more of the non-volatile memory 130, the DRAM 140 and the peripheral devices 150a-150b. A load instruction is typically used to transfer data between memory and the microprocessor 110. A move instruction is used to transfer data between architectural registers. The dashed lines shown in the computer system 100 indicate a few examples of the data transfers performed by move and load operations.

In addition to including processor cores 112a-112b connected to corresponding cache memory subsystems 116a-116b, the microprocessor 110 may also include interface logic 118, and a memory controller 120. Other logic and inter- and intra-block communication is not shown for ease of illustration. The illustrated functionality of the microprocessor 110 may be incorporated upon a single integrated circuit. In another embodiment, the illustrated functionality is incorporated in a chipset on a computer motherboard. In some embodiments, the microprocessor 110 may be included in a desktop or a server. In yet another embodiment, the illustrated functionality is incorporated in a semiconductor die on a system-on-a-chip (SOC).

Each of the processor cores 112a-112b may include circuitry for executing instructions according to a given ISA as described earlier. In one embodiment, each of the processor cores 112a-112b may include a superscalar, multi-threaded microarchitecture used for processing instructions of a given ISA. Although multiple general-purpose processor cores are shown in the microprocessor 110, in various other embodiments, the microprocessor 110 may include one or more other specific cores, such as a digital signal processor (DSP), a graphics processing unit (GPU), an application specific integrated circuit (ASIC), and so forth.

Each of the cache memory subsystems 116a-116b may reduce memory latencies for a respective one of the processor cores 112a-112b. In addition, one or more shared cache memory subsystems may be used. A reduced miss rate achieved by the additional memory provided by the cache memory subsystems 116a-116b helps hide the latency gap between a given one of the processor cores 112a-112b and the off-chip memory.

If a cache miss occurs, such as a requested block is not found in a respective one of the cache memory subsystems 116a-116b, then a read request may be generated and transmitted to the memory controller 120. The memory controller 120 may translate an address corresponding to the requested block and send a read request to the off-chip DRAM 140 through the memory bus 122. The memory controller 120 may include control circuitry for interfacing to the memory channels and following a corresponding protocol. Additionally, the memory controller 120 may include request queues for queuing memory requests. The off-chip DRAM 140 may be filled with data from the off-chip non-volatile memory 130. The off-chip non-volatile memory 130 may provide a non-volatile, random access secondary storage of data. In one embodiment, the off-chip non-volatile memory 130 may include one or more hard disk drives (HDDs). In another embodiment, the off-chip non-volatile memory 130 utilizes a Solid-State Disk (SSD).

The off-chip DRAM 140 may be a type of dynamic random-access memory that stores each bit of data in a separate capacitor within an integrated circuit. Unlike HDDs and flash memory, the DRAM 140 may be volatile memory, rather than non-volatile memory. The off-chip DRAM 140 may include a multi-channel memory architecture. This type of architecture may increase the transfer speed of data to the memory controller 120 by adding more channels of communication between them.

Although only two peripheral devices are shown in the computer system 100 for illustrative purposes, another number of peripheral devices may be connected to the microprocessor 110. One or more of the peripheral devices 150a-150b may be a display such as a touchscreen, a modern TV, a computer monitor, or other type of display. The computer monitor may include a thin film transistor liquid crystal display (TFT-LCD) panel. Additionally, the display may include a monitor for a laptop and other mobile devices. A video graphics subsystem may be used between the display and the microprocessor 110. The video graphics subsystem may be a separate card on a motherboard and include a graphics processing unit (GPU). One or more of the peripheral devices 150a-150b may be one of a typically utilized input/output device such as a keyboard, mouse, printer, modem, and so forth.

As described earlier, the dashed lines shown in the computer system 100 indicate a few examples of the data transfers performed by move and load operations. A given ISA may have a number of different move instructions. Depending on whether the software application is in a 16-bit or 32-bit code segment and whether an override instruction prefix is used, a move operation may transfer 8-bits, 16-bits, 32-bits or 64-bits of data. A significant percentage of the assembly language instructions used to implement the software programmer's application may include these move operations.

The mnemonic mov for the move instruction is a slight misnomer. Generally, the move instruction does copy data from one location to another. For example, the move instruction creates a copy of the data content in a first location specified by a source operand and writes this data content to a second location specified by a destination operand. However, the first location specified by the source operand does not become empty or invalid. The data content originally stored in the second location specified by the destination operand is generally overwritten during the execution of the move instruction. However, as described later, the data content originally stored in the second location specified by the destination operand may not be overwritten when the move instruction is converted to a zero cycle move operation. Rather, the destination operand may be assigned a renamed register number (or any other suitable identifier) that is also used by the source operand.

The move operation may occur frequently during the execution of software applications, such as being used in subroutines. A subroutine may also be referred to as a procedure or as a function. Subroutines reduce the cost of developing large, reliable programs. Subroutines are often collected into libraries and used for sharing software. At the beginning of subroutines, a base pointer is assigned a value stored in a stack pointer. A move operation is used for this assignment. At the end of subroutines, the stack pointer is assigned a value stored in the base pointer. Again, a move operation is used for this assignment.

In addition to out-of-order issue of instructions to execution units within a superscalar microarchitecture, each of the processor cores 112a-112b may perform register renaming to increase throughput. Each of the processor cores 112a-112b may include a set of physical registers 114a-114b larger than a set of integer and floating-point architecturally visible registers. For example, in some embodiments, each of the processor cores 112a-112b includes 32 architecturally visible architectural registers and 192 physical registers 114a-114b.

Using hardware, each of the processor cores 112a-112b dynamically renames an architectural register identifier used for a source operand. Similarly, the hardware dynamically renames an architectural register identifier used for a destination operand. The renaming may occur after instruction decode. When an architectural register identifier is renamed, a new physical register identifier from the free list is used to replace an old physical register identifier which was previously mapped to the architectural register identifier. When an instruction commits (i.e., retires), the old physical register identifier becomes a candidate to return to the free list.

When the hardware renames an architectural register identifier with a physical register identifier, the hardware stores the mapping in a data structure, such as a mapping table. As used herein, an identifier for either an architectural register or a physical register may also be referred to as a number. Therefore, an architectural register identifier may also be referred to as an architectural register number. Similarly, a physical register identifier may be referred to as a physical register number. The physical register number used to rename an architectural register number may also be referred to as a rename register number.

In one embodiment, each of the processor cores 112a-112b includes control logic that determines a given move instruction includes architectural register identifiers both for a source operand and a destination operand rather than an immediate value or an address for a memory location. In response to this determination, the control logic may assign a given rename register number associated with the source operand of the given move instruction to the destination operand of the given move instruction. Each of the source operand and the destination operand are now mapped to a same rename register number. In addition, the control logic may mark the given move instruction to prevent it from proceeding in the pipeline of the processor core. For example, the control logic may mark the given move instruction to indicate completion at the dispatch pipeline stage.

The value of the rename register number used for both the source and the destination operands may also be bypassed to one or more instructions younger in program order than the given move instruction. These one or more younger instructions may be in a same rename group as the given move instruction and may be dependent on the given move instruction. The actions of assigning a same rename register number to both the source operand and the destination operand of the given move instruction and bypassing this rename register number to younger, dependent instructions creates duplicate mappings in the mapping table. This rename register number represents two or more architectural registers. The control logic may store the multiple mappings for the rename register number. Additionally, the control logic may maintain a history file to track the last reference to a physical register rather than maintaining a count to track the number of mappings to each rename register number. It is noted that the terms "rename register number" and "physical register number" may be used interchangeably herein.

Each of the processor cores 112a-112b may include a free list data structure for storing physical register numbers for physical registers that are not currently assigned to any architectural registers. In other words, the physical register numbers stored in the free list correspond to physical registers which are available to be assigned to architectural registers. In various embodiments, the free list has a number of entries equal to the number of physical registers. For example, each of the processor cores 112a-112b may include 192 physical registers. Therefore, the free list in this embodiment would have 192 entries. In some embodiments, the free list may be implemented with flip-flop registers, wherein each entry corresponds to a respective rename register number. In the remainder of the description below, examples are given of register renaming for various instructions being executed.

Figure 2:
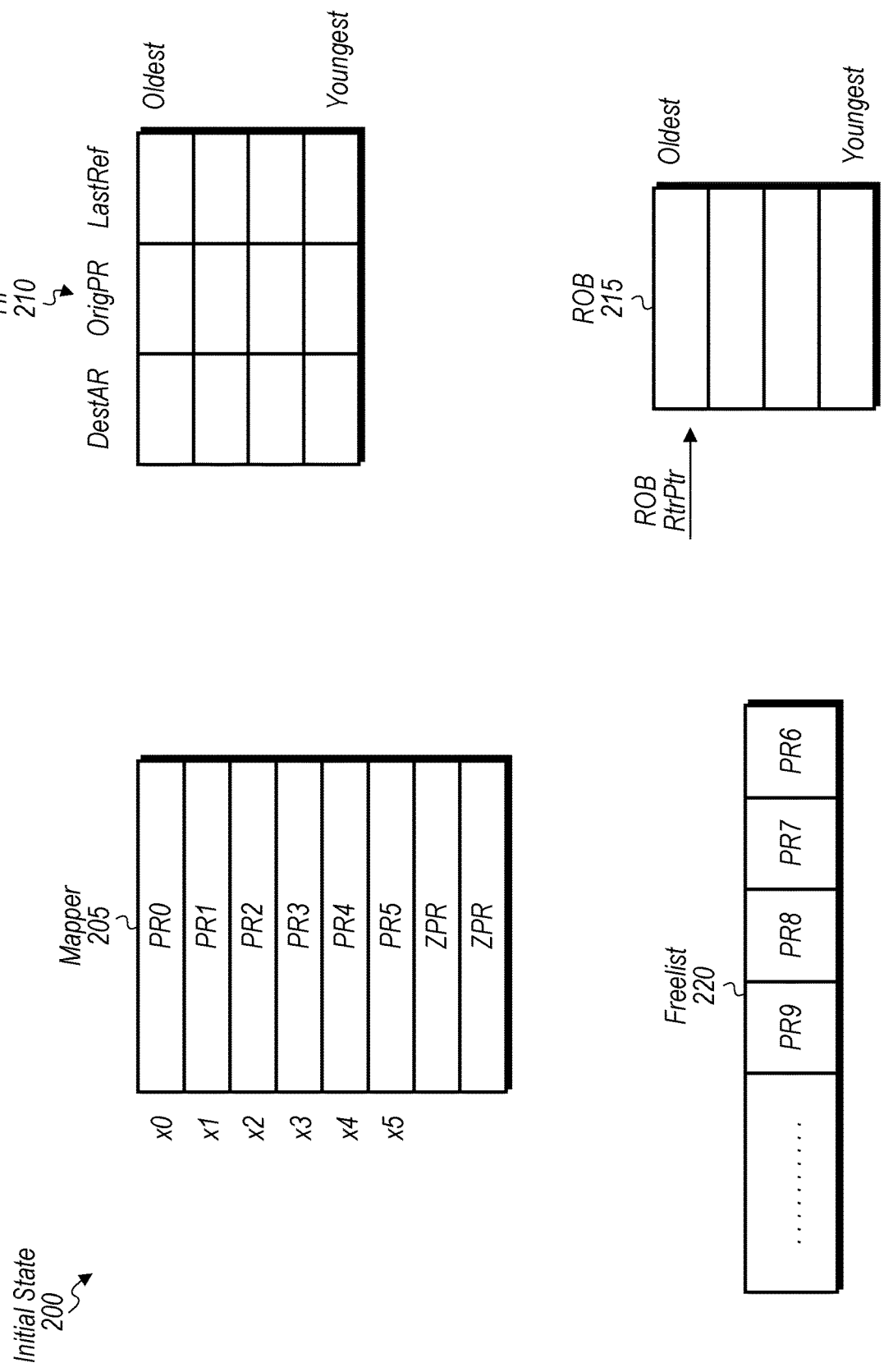
FIG. 2 is a generalized block diagram illustrating one embodiment of an initial state of register renaming.

Turning now to FIG. 2, a generalized block diagram illustrating one embodiment of an initial state 200 of register renaming is shown. In one embodiment, the structures for implementing register renaming include at least mapper 205, history file (HF) 210, reorder buffer 215, and freelist 220. Mapper 205 includes entries for architectural register to physical register mappings that are currently in use as of the point in time of initial state 200. Mapper 205 also includes entries for zero physical registers (ZPRs) which are used during system initialization.

History file 210 includes entries that map previous destination architectural registers to original physical registers. Also, each entry in history file 210 includes a field to indicate if this entry is the last reference for the specified physical register. From top to bottom, the entries of HF 210 are listed from oldest to youngest. At the point in time represented by initial state 200, there are no entries in HF 210. Reorder buffer 215 stores entries for speculatively executed instructions. Reorder buffer 215 is maintained so as to ensure in-order commit and retirement of instructions. Freelist 220 consists of identifiers (IDs) of physical registers that are available for being assigned to architectural registers.

Figure 3:
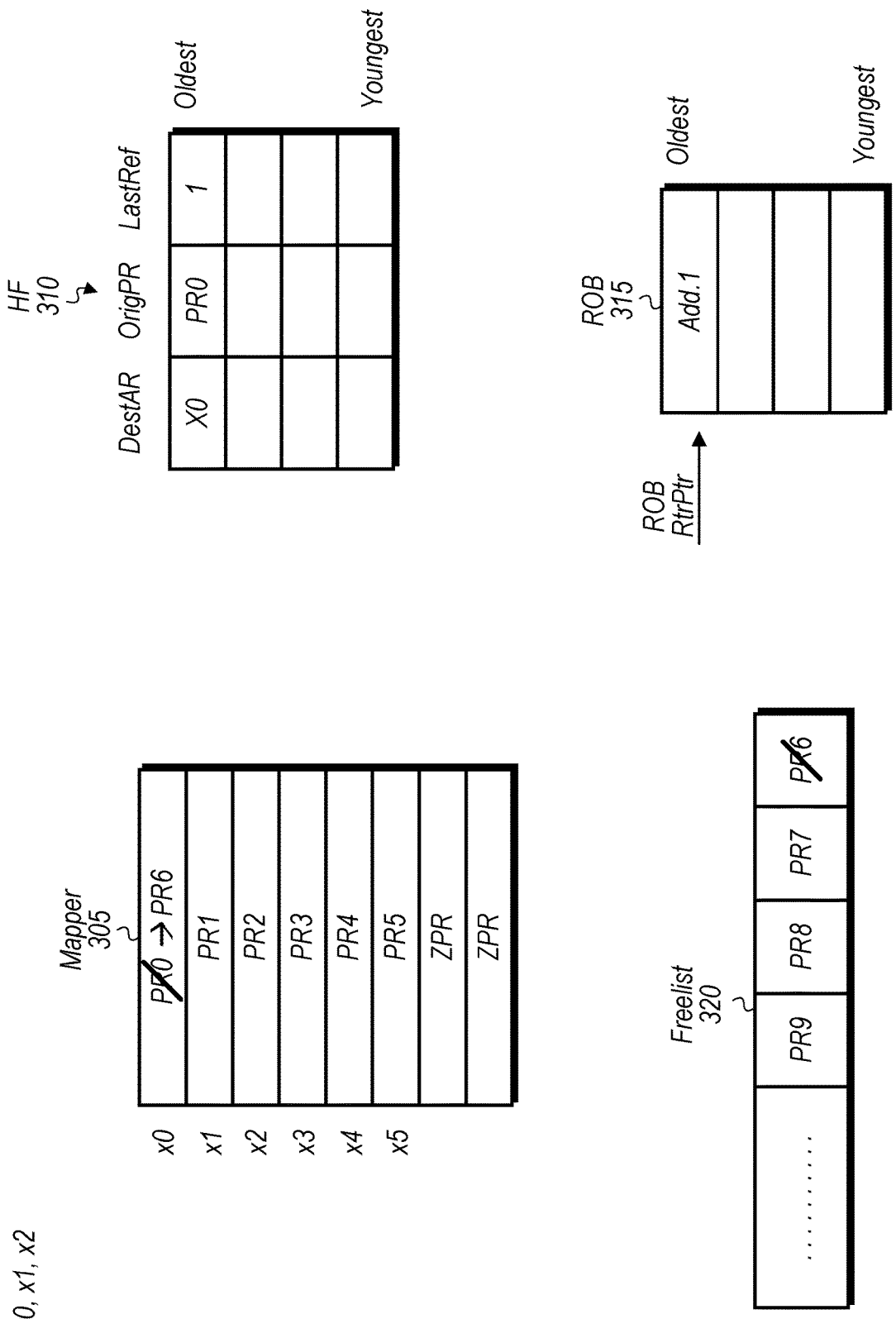
FIG. 3 is a generalized block diagram illustrating one embodiment of register renaming at a subsequent point in time.

Referring now to FIG. 3, a generalized block diagram illustrating one embodiment of register renaming 300 at a subsequent point in time is shown. FIG. 3 is representative of a later point in time from the embodiment shown in FIG. 2. At the point in time represented in FIG. 3, the instruction "Add x0, x1, x2" has been decoded. When this instruction is prepared for execution, a new physical register from the free list 320 is assigned to the destination architectural register x0. In the example illustrated in FIG. 3, the entry for x0 in mapper 305 is updated to point to physical register 6 (PR6). As a result, PR6 is removed from free list 320. Then, the old physical register PR0 (to which x0 was previously mapped) is checked against all entries in mapper 305. Since PR0 is not present in mapper 305, the entry in HF 310 for PR0 is marked as the last reference. Also, an entry corresponding to the instruction "Add x0, x1, x2" is added to reorder buffer 315.

Figure 4:
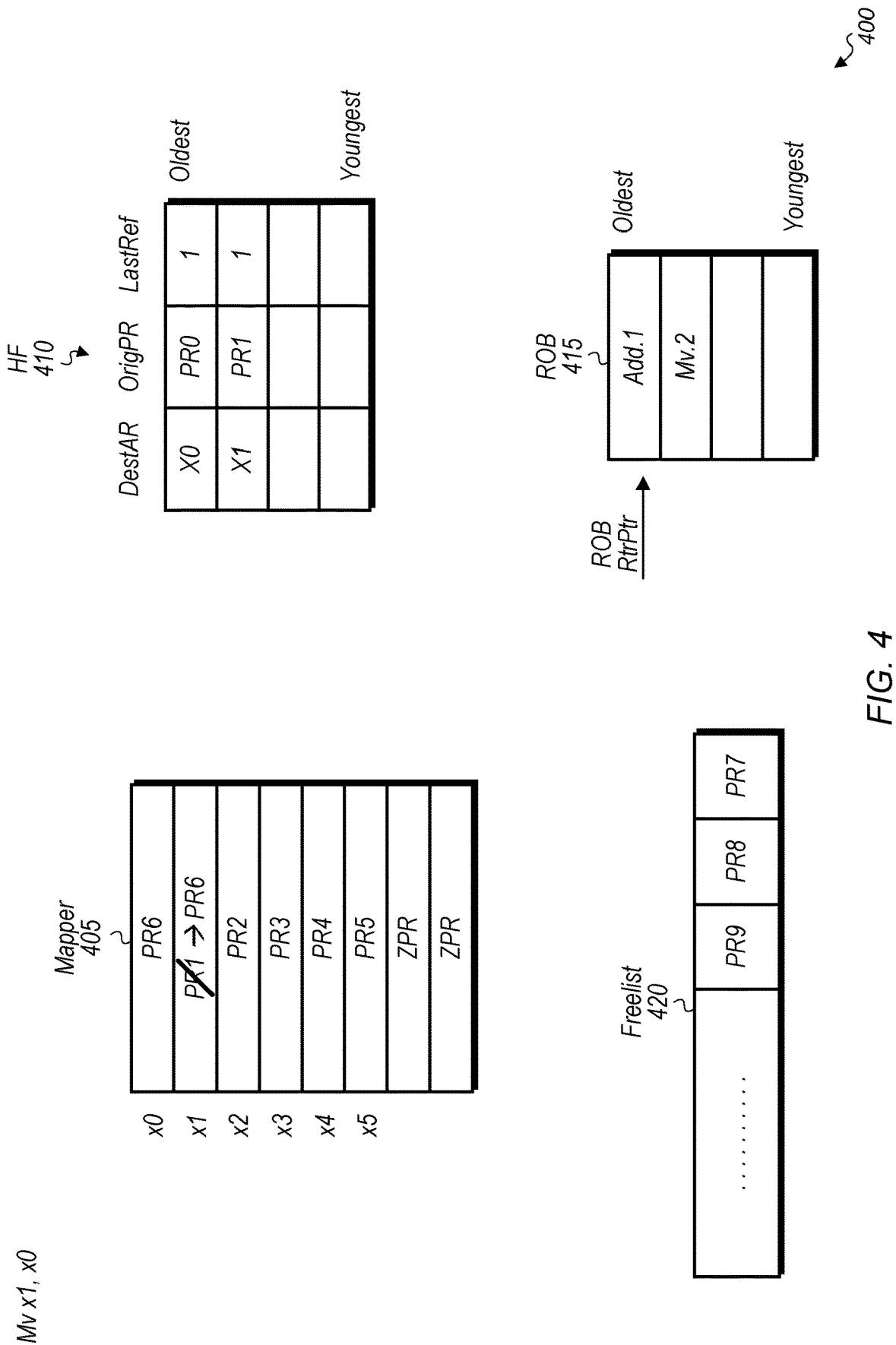
FIG. 4 is a generalized block diagram illustrating one embodiment of register renaming at a subsequent point in time.

Turning now to FIG. 4, a generalized block diagram illustrating one embodiment of register renaming 400 at a subsequent point in time is shown. FIG. 4 is representative of a later point in time from the embodiment shown in FIG. 3. At the point in time represented in FIG. 4, the instruction "Mv x1, x0" has been decoded. When this instruction is prepared for execution, the physical register (PR6) is assigned to destination architectural register x1 for the zero-cycle move. The old physical register (PR1) is checked against all entries in mapper 405. Since PR1 is not present in the entries of mapper 405, PR1 is marked as the last reference in HF 410. Also, an entry is added to reorder buffer 415 for the instruction "Mv x1, x0". Also shown is freelist 420. It is noted that in the previously used register duplicate array (RDA) scheme, a new entry would have been created for PR6 with a reference count of 2. However, in the new physical register last reference scheme, keeping track of the total number of references to a physical register is no longer necessary. Rather, it is sufficient to track only the last reference to the physical register. This is a more elegant scheme that is easier to implement, uses less area, and has higher performance.

Figure 5:
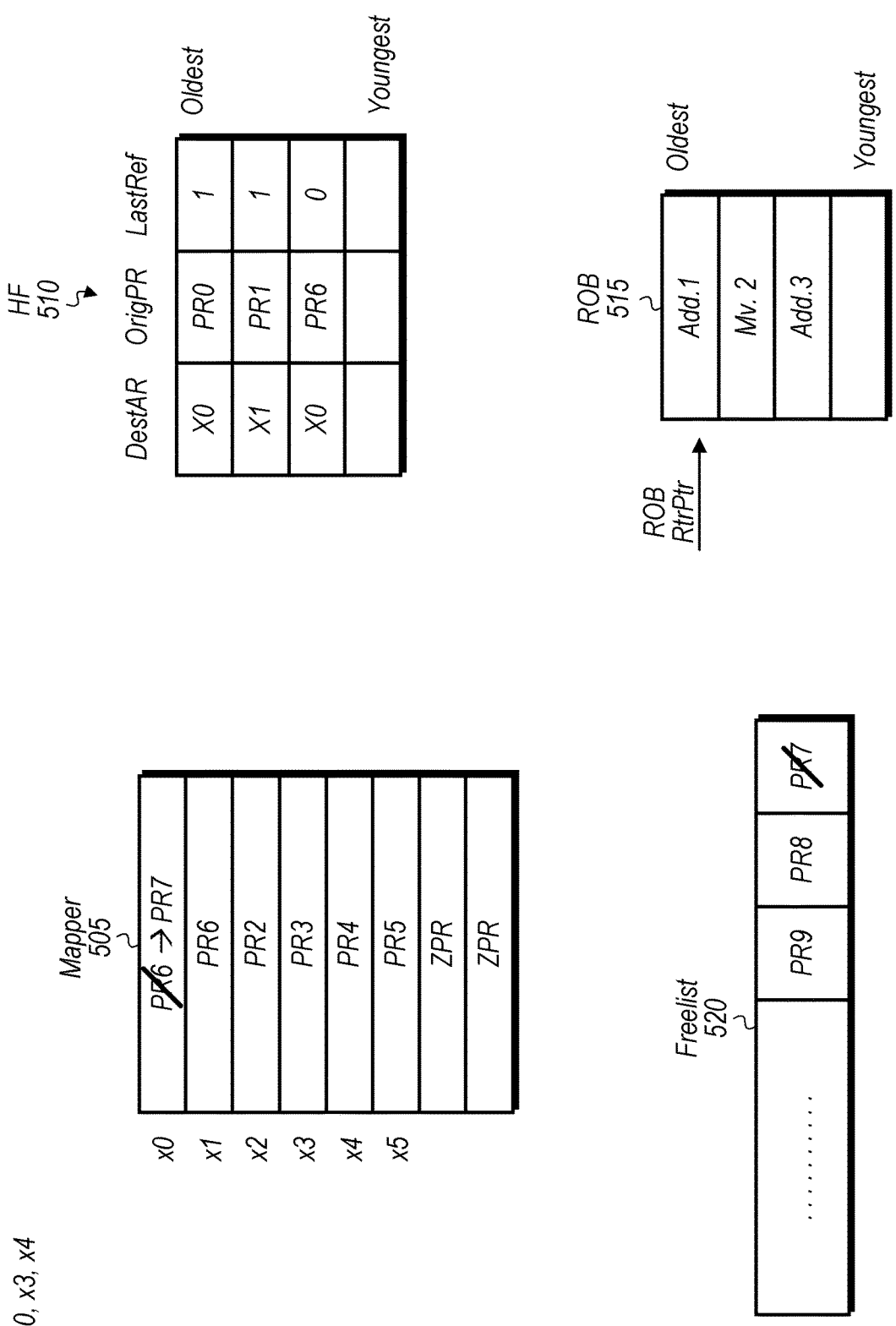
FIG. 5 is a generalized block diagram illustrating one embodiment of register renaming at a subsequent point in time.

Referring now to FIG. 5, a generalized block diagram illustrating one embodiment of register renaming 500 at a subsequent point in time is shown. FIG. 5 is representative of a later point in time from the embodiment shown in FIG. 4. At the point in time represented in FIG. 5, the instruction "Add x0, x3, x4" has been decoded. When this instruction is prepared for execution, the physical register (PR7) is selected from free list 520 and assigned to the destination architectural register x0. Accordingly, this physical register (PR7) is removed from free list 520. The old physical register (PR6) (to which destination architectural register x0 was previously mapped) is checked against all entries in mapper 505. Since PR6 is present in the entries of mapper 505, PR6 is not marked as the last reference in the new entry of HF 510. Also, an entry is added to reorder buffer 515 for the instruction "Add x0, x3, x4".

Figure 6:
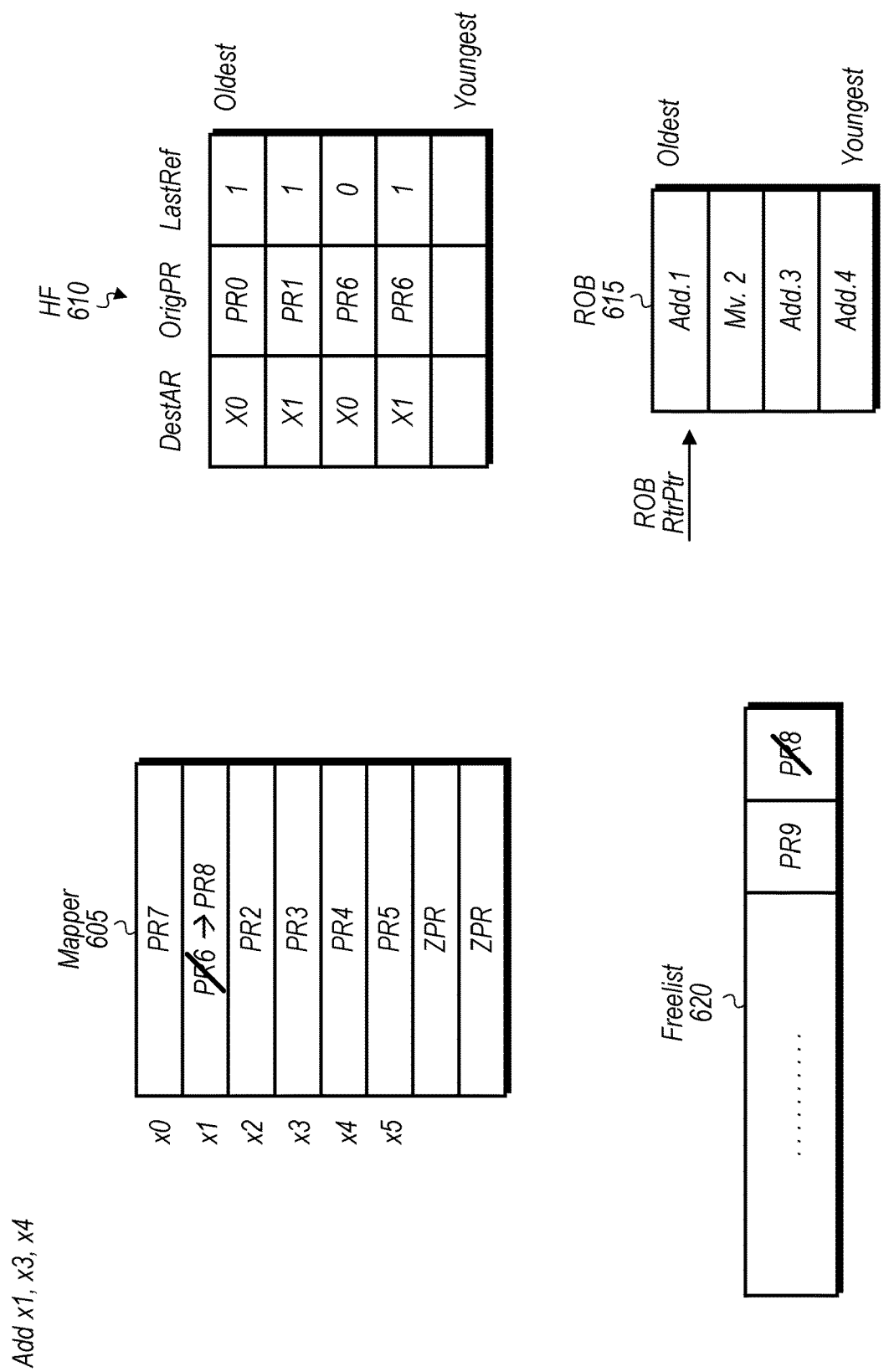
FIG. 6 is a generalized block diagram illustrating one embodiment of register renaming at a subsequent point in time.

Turning now to FIG. 6, a generalized block diagram illustrating one embodiment of register renaming 600 at a subsequent point in time is shown. FIG. 6 is representative of a later point in time from the embodiment shown in FIG. 5. At the point in time represented in FIG. 6, the instruction "Add x1, x3, x4" has been decoded. When this instruction is prepared for execution, the physical register (PR8) is selected from free list 620 and assigned to the destination architectural register x1. Accordingly, the entry in free list 620 for this physical register (PR8) is invalidated. The old physical register (PR6) is checked against all entries in mapper 605. Since PR6 is now not present in the entries of mapper 605, PR6 is marked as the last reference in the new entry of HF 610. Also, an entry is added to reorder buffer 615 for the instruction "Add x1, x3, x4".

Figure 7:
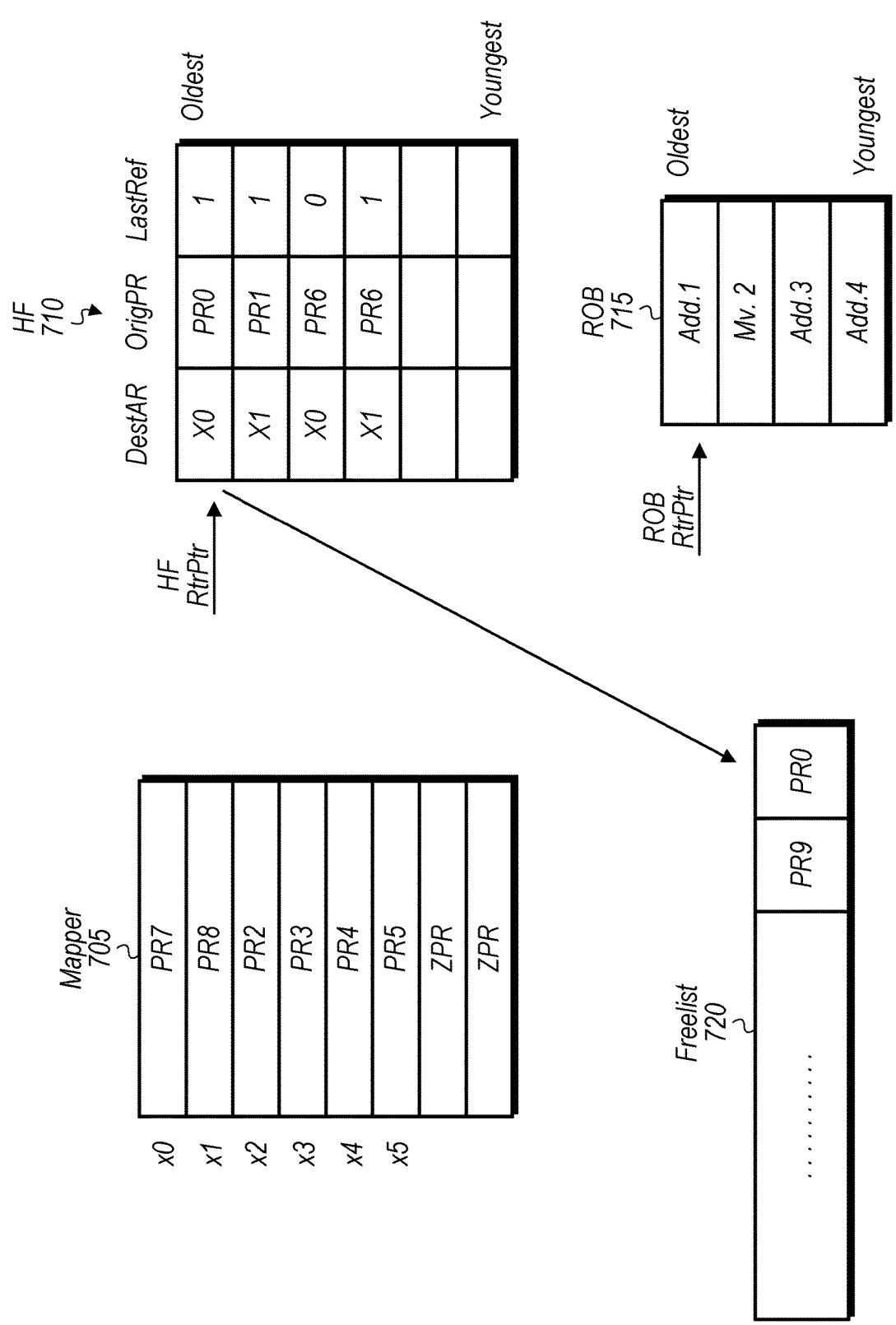
FIG. 7 is a generalized block diagram illustrating one embodiment of register renaming at a subsequent point in time.

Referring now to FIG. 7, a generalized block diagram illustrating one embodiment of register renaming 700 at a subsequent point in time is shown. FIG. 7 is representative of a later point in time from the embodiment shown in FIG. 6. At the point in time represented in FIG. 7, the add instruction pointed to by the retire pointer in reorder buffer 715 is being retired. When this add instruction is retired, the entry in history file 710 for this add instruction is located. Since the "last reference" indicator is set for this entry in history file 710, the physical register specified in this entry, physical register (PR0), is returned to free list 720. It is noted that the contents of mapper 705 are unchanged from mapper 605 (of FIG. 6).

Figure 8:
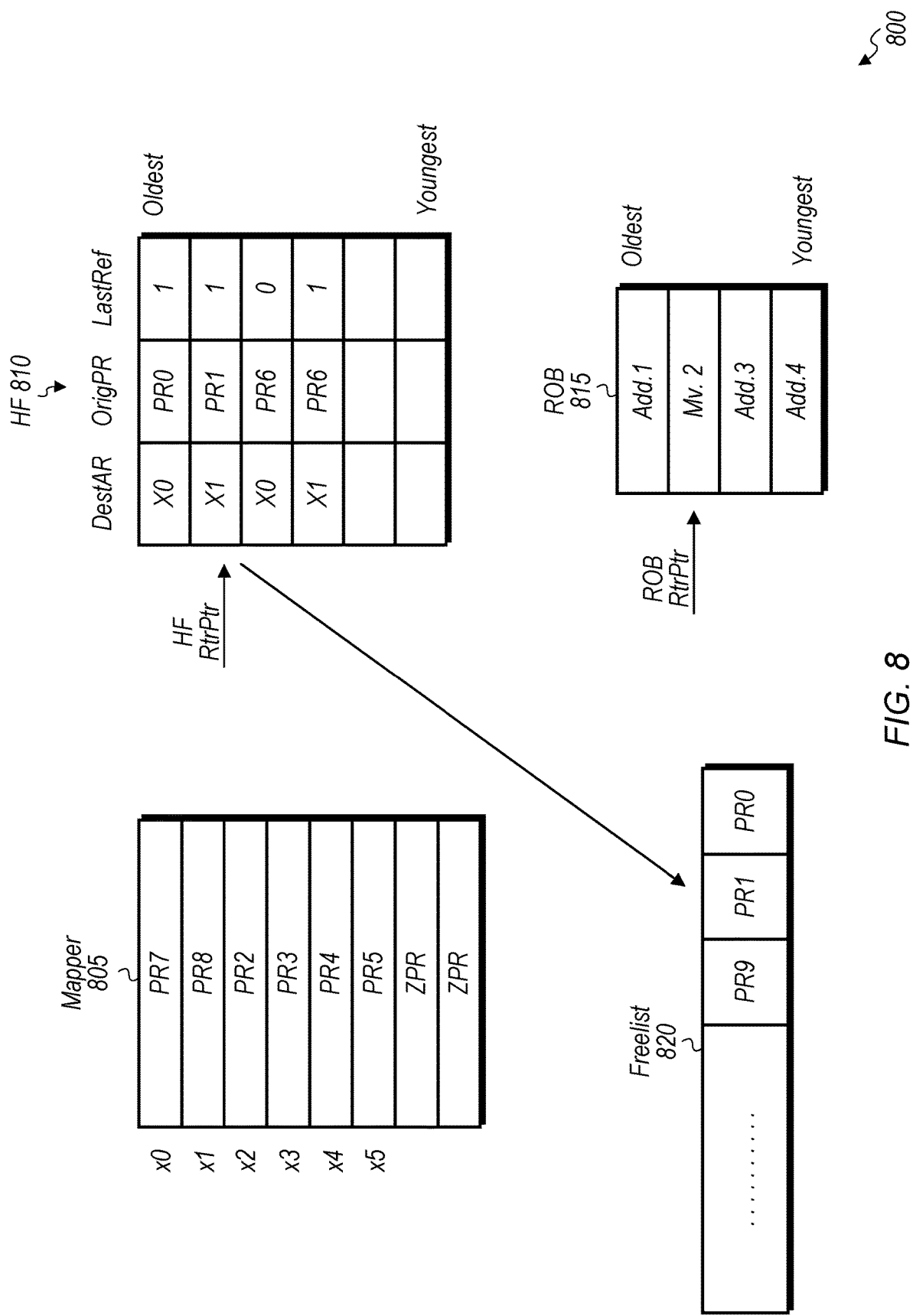
FIG. 8 is a generalized block diagram illustrating one embodiment of register renaming at a subsequent point in time.

Turning now to FIG. 8, a generalized block diagram illustrating one embodiment of register renaming 800 at a subsequent point in time is shown. FIG. 8 is representative of a later point in time from the embodiment shown in FIG. 7. At the point in time represented in FIG. 8, the move instruction pointed to by the retire pointer in reorder buffer 815 is being retired. When this move instruction is retired, the entry in history file 810 for this move instruction is queried. Since the "last reference" indicator is set for this entry in history file 810, the physical register specified in this entry, PR1, is returned to free list 820. It is noted that the contents of mapper 805 are unchanged from mapper 705 (of FIG. 7).

Figure 9:
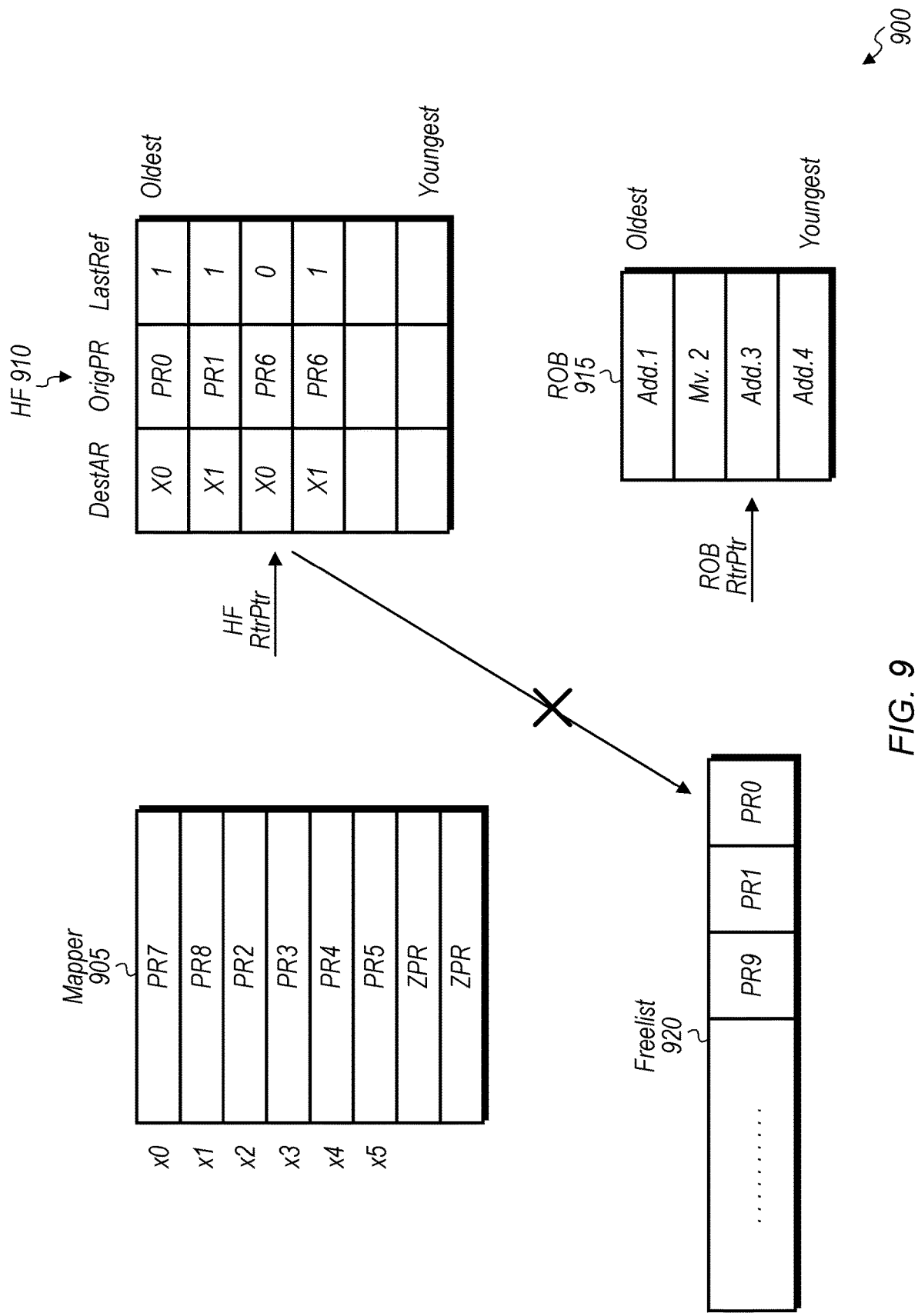
FIG. 9 is a generalized block diagram illustrating one embodiment of register renaming at a subsequent point in time.

Referring now to FIG. 9, a generalized block diagram illustrating one embodiment of register renaming 900 at a subsequent point in time is shown. FIG. 9 is representative of a later point in time from the embodiment shown in FIG. 8. At the point in time represented in FIG. 9, the add instruction pointed to by the retire pointer in reorder buffer 915 is being retired. When this add instruction is retired, the corresponding entry in history file 910 is located. Since the "last reference" indicator is not set for this entry in history file 910, the physical register specified in this entry, PR6, is prevented from being returned to free list 920. The "last reference" indicator not being set indicates that there is at least one other reference to PR6. In this case, the other reference to PR6 comes from an unretired instruction. It is noted that the contents of mapper 905 are unchanged from mapper 805 (of FIG. 8).

Figure 10:
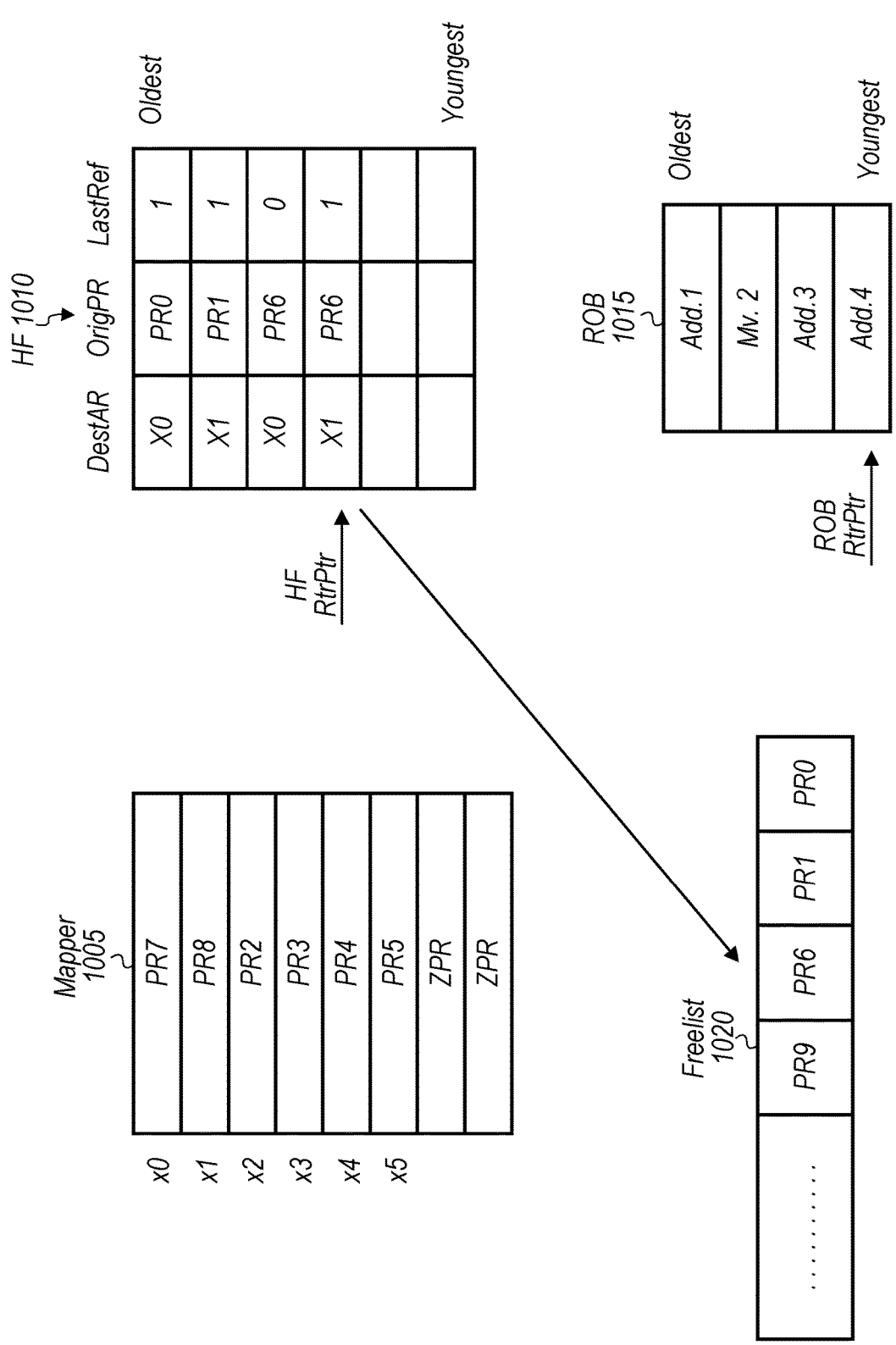
FIG. 10 is a generalized block diagram illustrating one embodiment of register renaming at a subsequent point in time.

Turning now to FIG. 10, a generalized block diagram illustrating one embodiment of register renaming 1000 at a subsequent point in time is shown. FIG. 10 is representative of a later point in time from the embodiment shown in FIG. 9. At the point in time represented in FIG. 10, the add instruction pointed to by the retire pointer in reorder buffer 1015 is being retired. When this add instruction is retired, the corresponding entry in history file 1010 is queried. Since the "last reference" indicator is set for this entry in history file 1010, the physical register specified in this entry, PR6, gets returned to free list 1020. It is noted that the contents of mapper 1005 are unchanged from mapper 905 (of FIG. 9).

Figure 11:
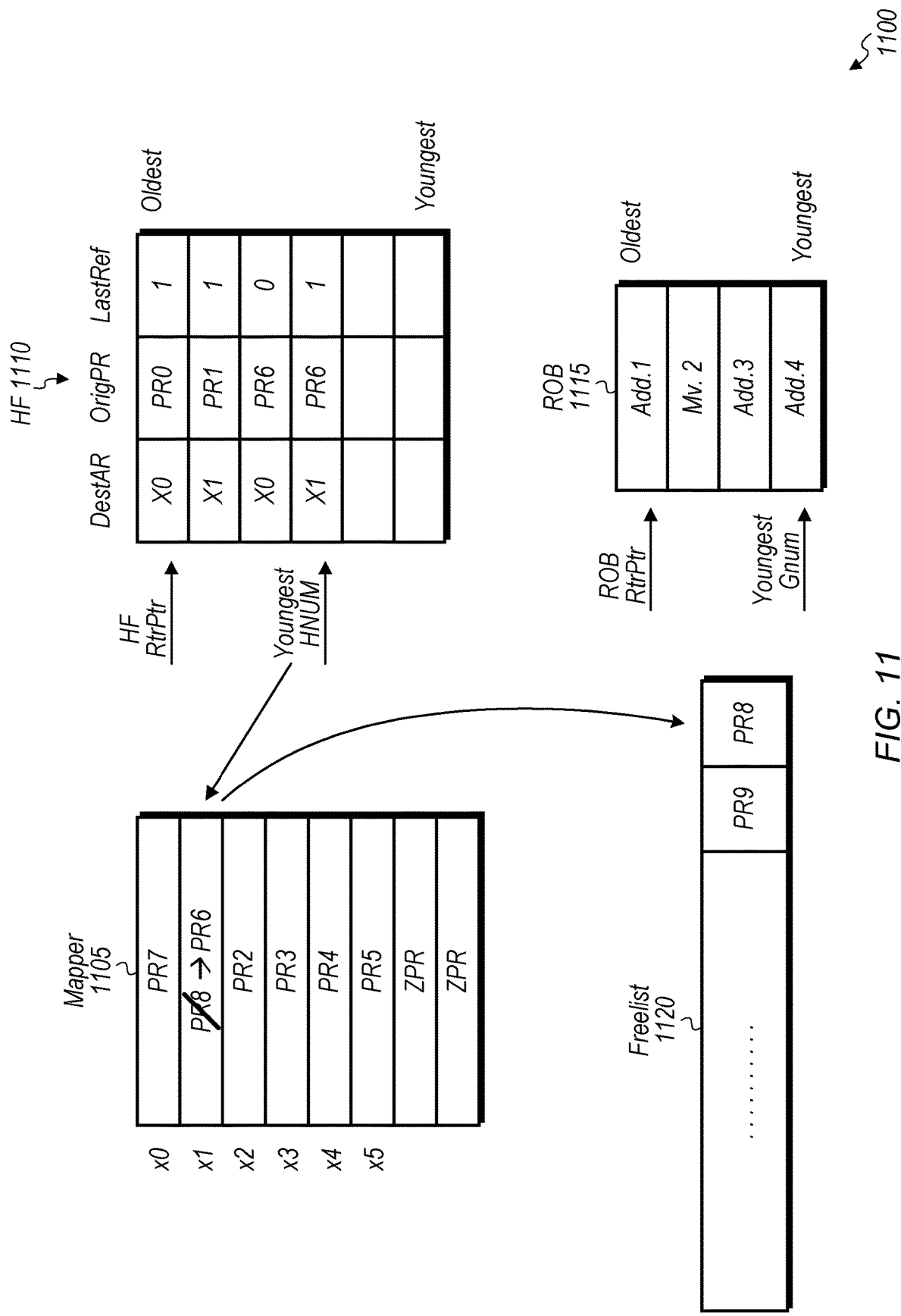
FIG. 11 is a generalized block diagram illustrating one embodiment of register renaming at a subsequent point in time.

Referring now to FIG. 11, a generalized block diagram illustrating one embodiment of register renaming 1100 at a subsequent point in time is shown. FIG. 11 is representative of a later point in time from the embodiment shown in FIG. 6. At the point in time represented in FIG. 11, a rewind of the instruction pointed to by the youngest Gnum pointer in reorder buffer 1115 is being initiated. As used herein, a "rewind" is defined as rolling back the effects of the speculative execution of some number of recent instructions and then returning execution to a previous instruction. For example, a rewind may be initiated as a result of any of various events, such as a branch misprediction or an exception. In some cases, a rewind restores the processor to a previous point in time using a checkpoint of a previous architectural state. After the checkpoint is restored, execution restarts again from an earlier instruction.

As shown in FIG. 11, the instruction pointed to by the youngest Gnum pointer is the add instruction "Add x1, x3, x4". When this instruction is rewound, the existing mapping of architectural register x1 to PR8 is obtained from the entry in mapper 1105. Then, the entry in mapper 1105 for architectural register x1 is reverted back to the old physical register (PR6). Also, the entries in mapper 1105 are searched to determine if any entries with PR8 exist. Also shown is history file 1110. Since no entries exist in mapper 1105 for PR8, PR8 is returned to freelist 1120.

Figure 12:
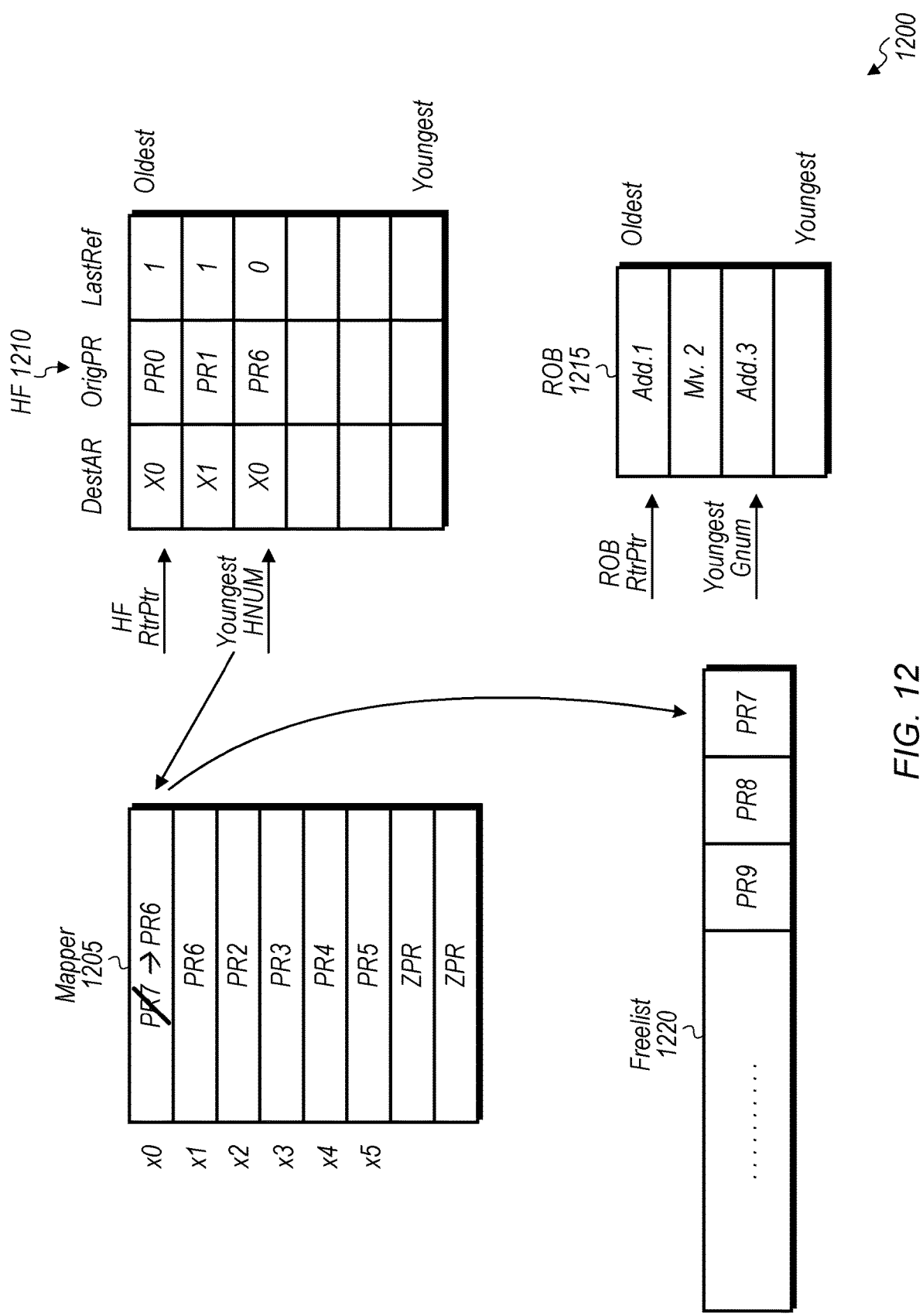
FIG. 12 is a generalized block diagram illustrating one embodiment of register renaming at a subsequent point in time.

Turning now to FIG. 12, a generalized block diagram illustrating one embodiment of register renaming 1200 at a subsequent point in time is shown. FIG. 12 is representative of a later point in time from the embodiment shown in FIG. 11. At the point in time represented in FIG. 12, a rewind of the instruction pointed to by the youngest Gnum pointer in reorder buffer 1215 is being initiated. This instruction pointed to by the youngest Gnum pointer is the add instruction "Add x0, x3, x4". When this instruction is rewound, the existing mapping of architectural register x0 to PR7 is obtained from the entry in mapper 1205. Then, the entry in mapper 1205 for architectural register x0 is reverted back to the old physical register (PR6). Also, the entries in mapper 1205 are searched to determine if any entries with PR7 exist. Also shown is history file 1210. Since no entries exist in mapper 1205 for PR7, PR7 is returned to freelist 1220.

Figure 13:
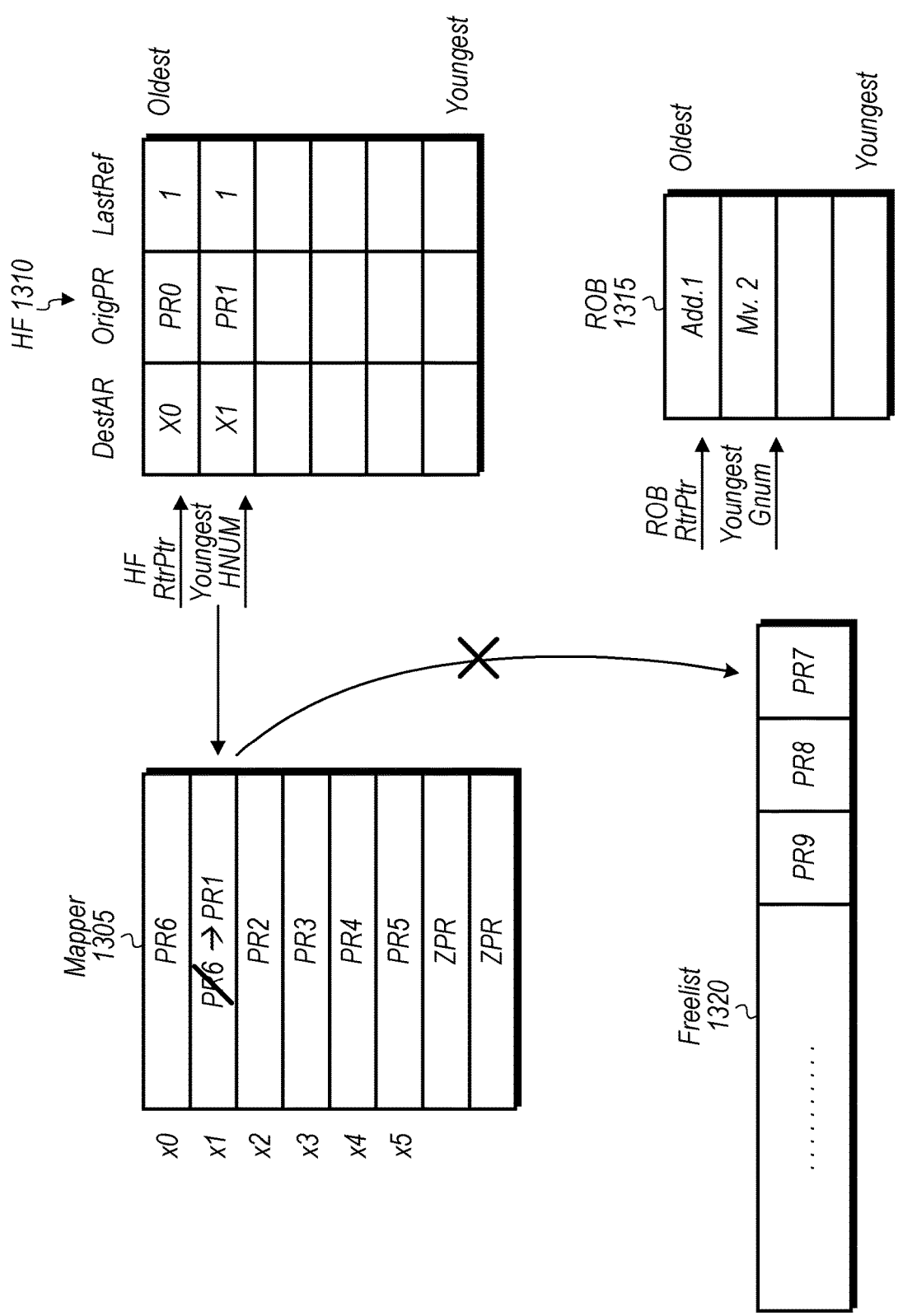
FIG. 13 is a generalized block diagram illustrating one embodiment of register renaming at a subsequent point in time.

Referring now to FIG. 13, a generalized block diagram illustrating one embodiment of register renaming 1300 at a subsequent point in time is shown. FIG. 13 is representative of a later point in time from the embodiment shown in FIG. 12. At the point in time represented in FIG. 13, a rewind of the instruction pointed to by the youngest Gnum pointer in reorder buffer 1315 is being initiated. This instruction pointed to by the youngest Gnum pointer is the move instruction "Mv x1, x0". When this instruction is rewound, the current mapping of architectural register x1 to PR6 is obtained from the entry in mapper 1305. Then, the entry in mapper 1305 for architectural register x1 is reverted back to the old physical register (PR1). Also shown is history file 1310. Also, the entries in mapper 1305 are searched to determine if any entries with PR6 exist. Since there is another entry in mapper 1305 for PR6, PR6 is not returned to freelist 1320.

Figure 14:
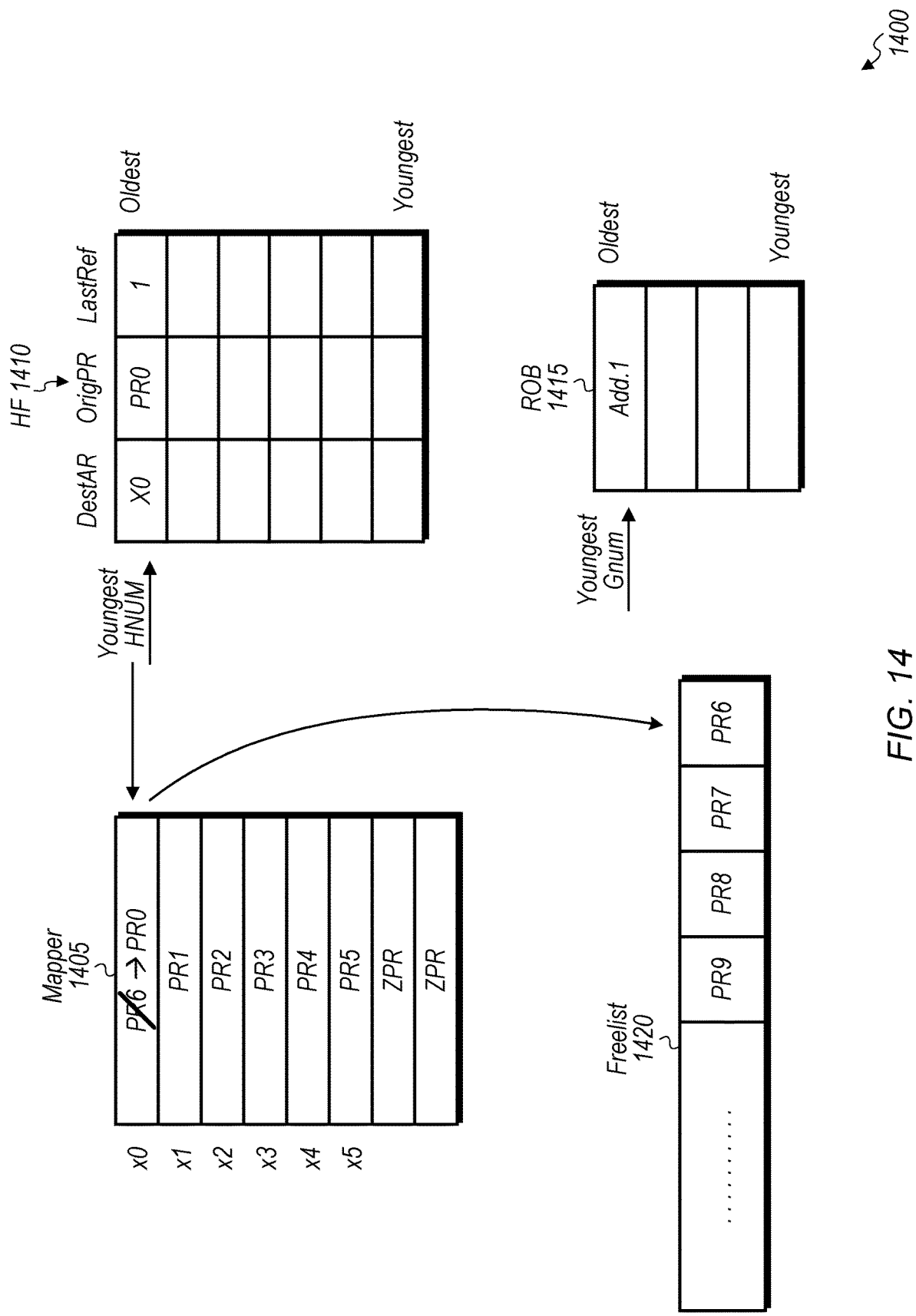
FIG. 14 is a generalized block diagram illustrating one embodiment of register renaming at a subsequent point in time.

Turning now to FIG. 14, a generalized block diagram illustrating one embodiment of register renaming 1400 at a subsequent point in time is shown. FIG. 14 is representative of a later point in time from the embodiment shown in FIG. 13. At the point in time represented in FIG. 14, a rewind of the instruction pointed to by the youngest Gnum pointer in reorder buffer 1415 is implemented. This instruction pointed to by the youngest Gnum pointer is the Add instruction "Add x0, x1, x2". When this instruction is rewound, the current mapping of architectural register x1 to PR6 is obtained from the entry in mapper 1305. Then, the entry in mapper 1305 for architectural register x1 is reverted back to its previous mapping to physical register (PR0). The entries in mapper 1405 are searched to determine if any entries with PR6 exist. Also shown is history file 1410. Since PR6 is no longer assigned to any entries in mapper 1405, PR6 is returned to freelist 1420.

Figure 15:
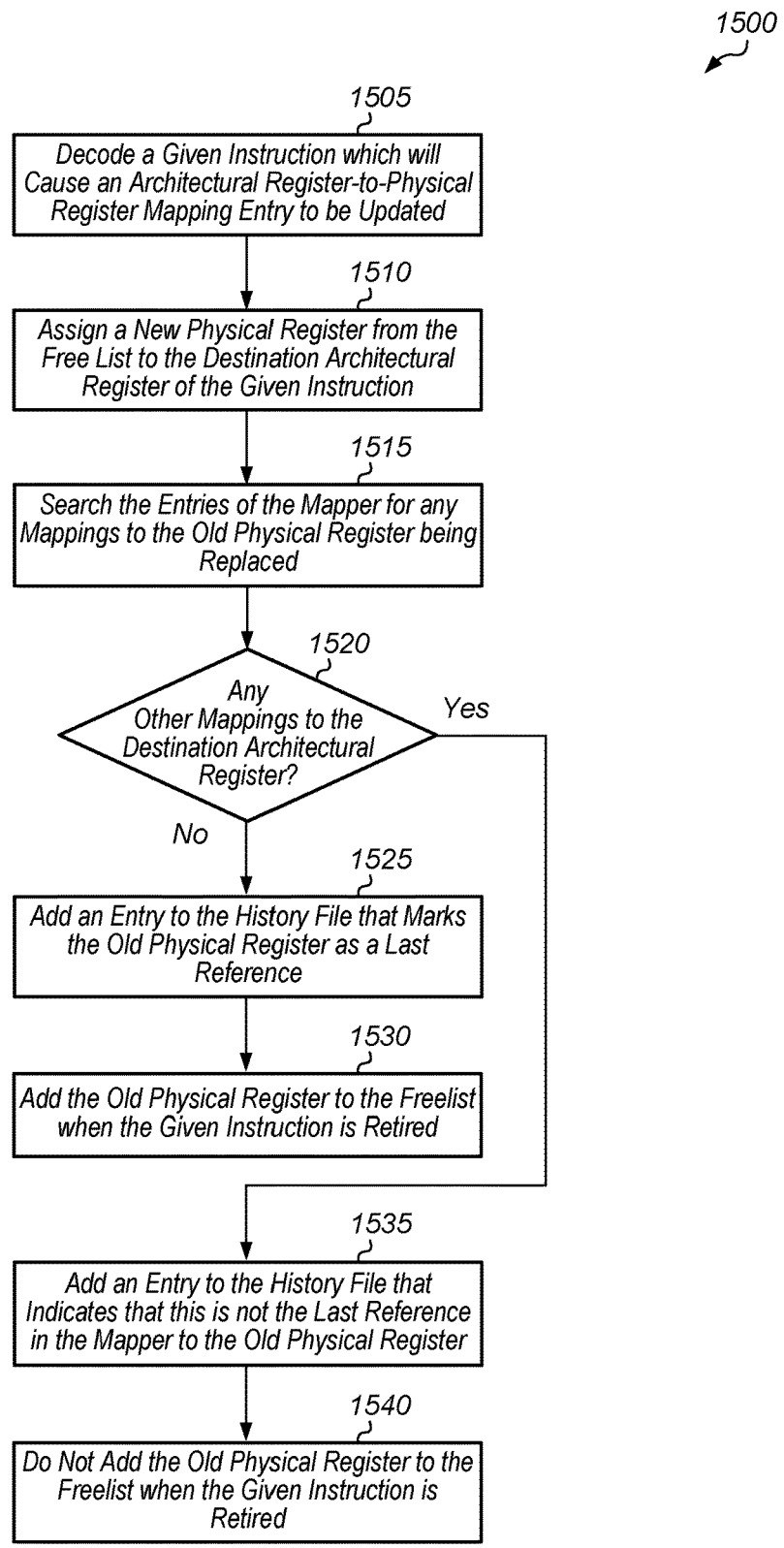
FIG. 15 is a flow diagram of one embodiment of a method for maintaining a physical register last reference indicator.

Referring now to FIG. 15, a generalized flow diagram of one embodiment of a method 1500 for maintaining a physical register last reference indicator is shown. For purposes of discussion, the steps in this embodiment (as well as for FIGS. 16 and 17) are shown in sequential order. However, in other embodiments some steps may occur in a different order than shown, some steps may be performed concurrently, some steps may be combined with other steps, and some steps may be absent.

A given instruction is decoded which will cause an architectural register-to-physical register mapping entry to be updated (block 1505). In response to decoding the given instruction, the processor assigns a new physical register from the free list to the destination architectural register of the given instruction (block 1510). Also, the processor searches the entries of the mapper for any mappings to the old physical register being replaced by the update to the mapper entry of the destination architectural register (block 1515).

If there are no other mappings in the mapper to the old physical register (conditional block 1520, "no" leg), then an entry is added to the history file that marks the old physical register as a last reference (block 1525). Later, when the given instruction is retired, the replaced physical register will be added to the freelist due to the history file entry being marked as a last reference (block 1530). After block 1530, method 1500 ends. If there is at least one reference in the mapper to the old physical register (conditional block 1520, "yes" leg), then an entry is added to the history file that indicates that this is not the last reference in the mapper to the old physical register (block 1535). Later, when the given instruction is retired, the old physical register will not be added to the freelist since the history file entry is not marked as a last reference (block 1540). After block 1540, method 1500 ends.

Figure 16:
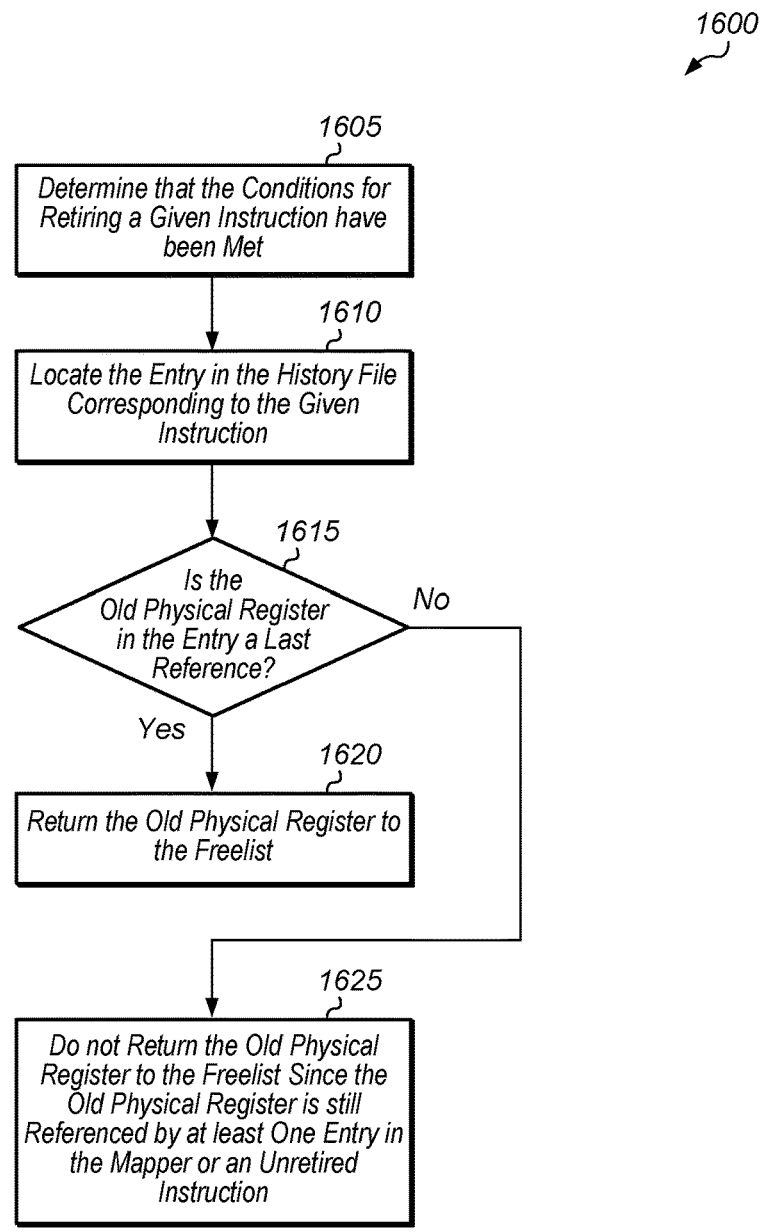
FIG. 16 is a flow diagram of one embodiment of a method for determining whether to return a previously mapped physical register to the freelist when retiring an instruction.

Turning now to FIG. 16, a generalized flow diagram of one embodiment of a method 1600 for determining whether to return a previously mapped physical register to the freelist when retiring an instruction is shown. A processor determines that the conditions for retiring a given instruction have been met (block 1605). In response to determining that the conditions for retiring the given instruction have been met, the entry in the history file corresponding to the given instruction is located (block 1610). If the old physical register specified in the corresponding history file entry is a last reference (conditional block 1615, "yes" leg), then the old physical register is returned to the freelist (block 1620). The old physical register is now available to be assigned to a destination architectural register for a subsequent instruction. After block 1620, method 1600 ends. If the corresponding history file entry indicates that the old physical register is not a last reference (conditional block 1615, "no" leg), then the old physical register is not returned to the freelist since it is still referenced by at least one entry in the mapper or an unretired instruction (block 1625). After block 1625, method 1600 ends.

Figure 17:
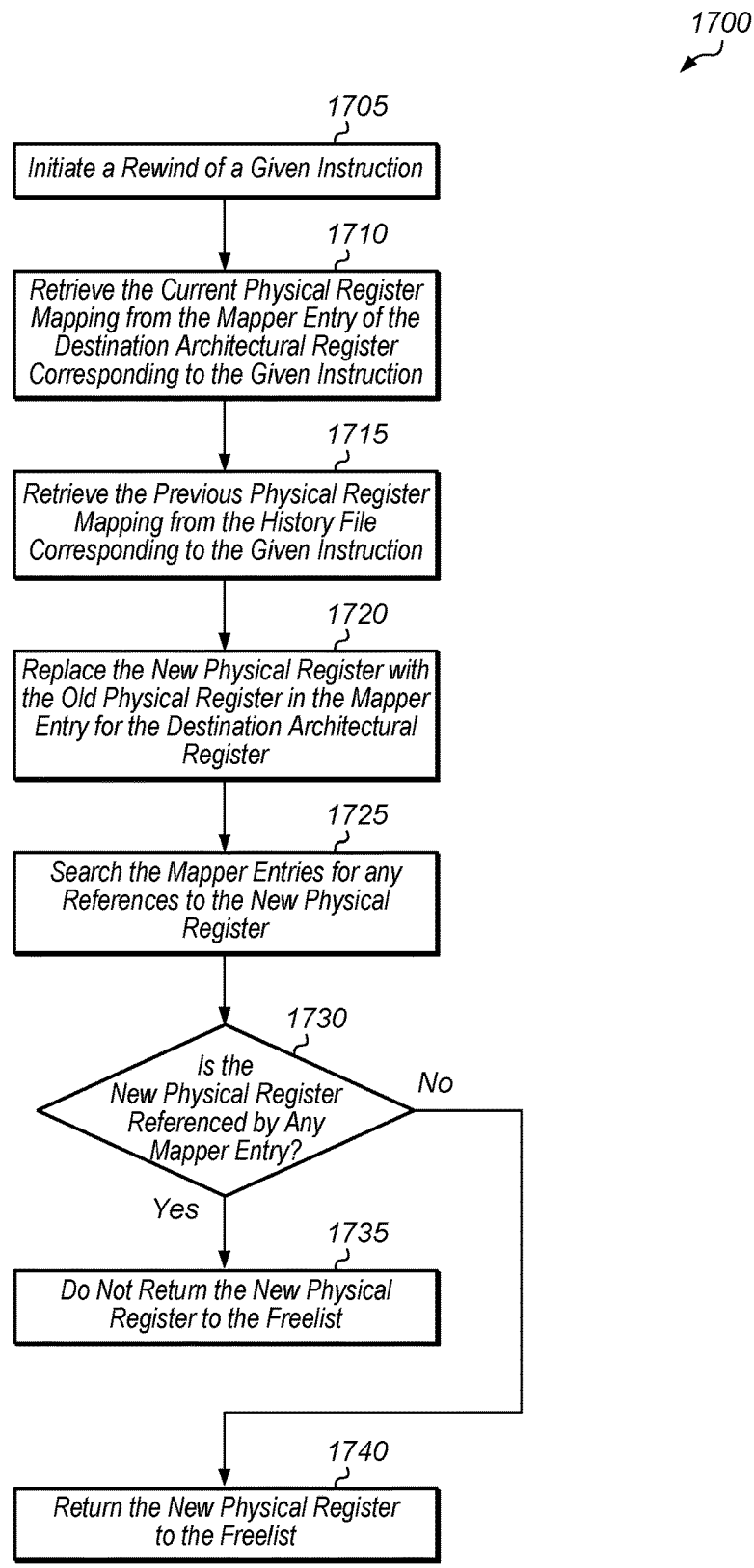
FIG. 17 is a flow diagram of one embodiment of a method for determining whether to return a previously mapped physical register to the freelist during a rewind.

Referring now to FIG. 17, a generalized flow diagram of one embodiment of a method 1700 for determining whether to return a previously mapped physical register to the freelist during a rewind operation is shown. A processor initiates a rewind of a given instruction (block 1705). In response to detecting the rewind of the given instruction, the processor retrieves the current physical register mapping from the mapper for the entry of the destination architectural register corresponding to the given instruction (block 1710). Also, the processor retrieves the previous physical register mapping from the history file entry corresponding to the given instruction (block 1715). Then, the processor replaces the new physical register with the old physical register in the mapper entry for the destination architectural register (block 1720). Also, the processor searches the mapper entries for any references to the new physical register (block 1725).

If the new physical register is referenced by any mapper entry (conditional block 1730, "yes" leg), then the processor does not return the new physical register to the freelist (block 1735). After block 1735, method 1700 ends. Otherwise, if the new physical register is not referenced by any of the mapper entries (conditional block 1730, "no" leg), then the processor returns the new physical register to the freelist (block 1740). After block 1740, method 1700 ends.

Figure 18:
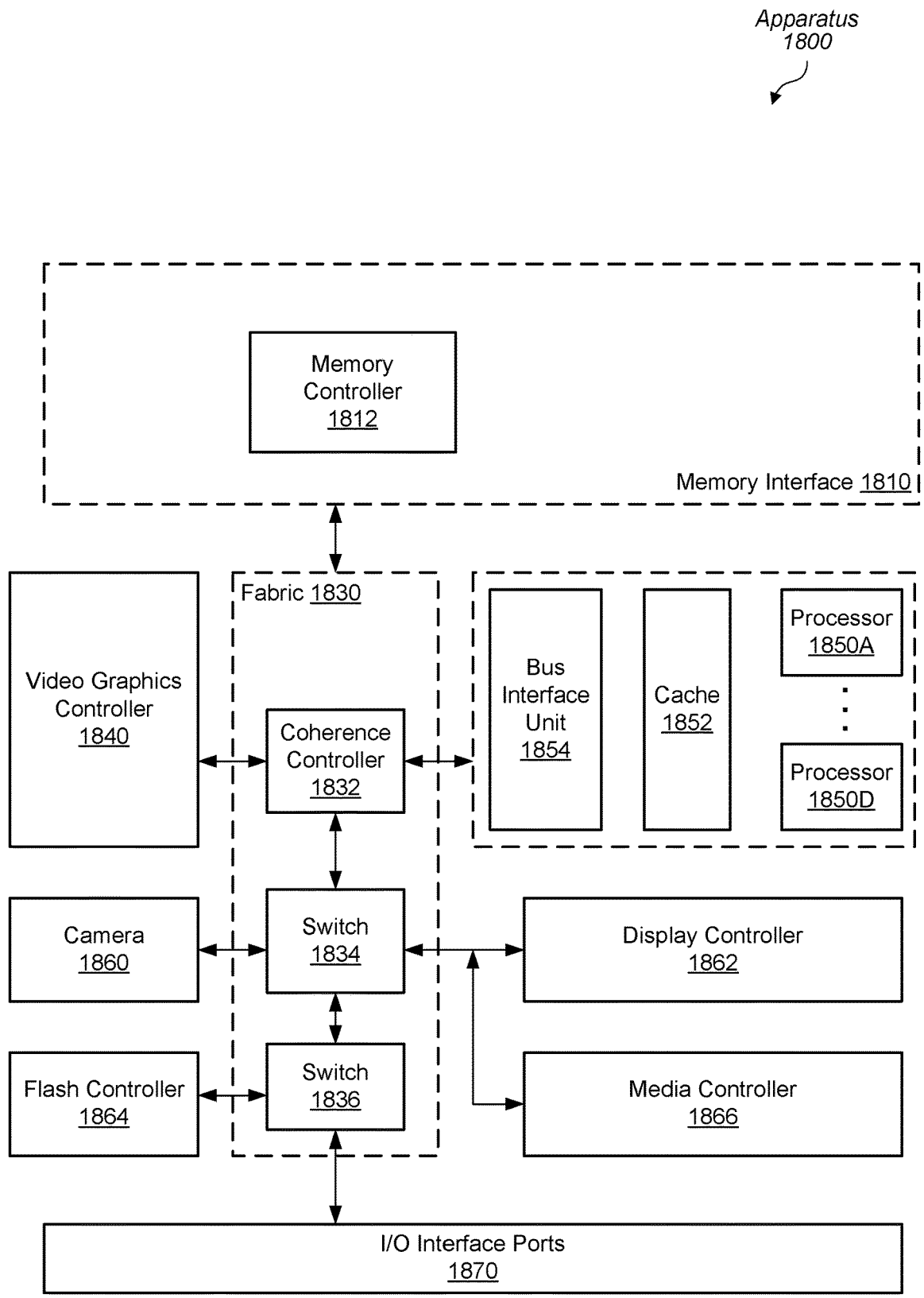
FIG. 18 is a block diagram of one embodiment of an apparatus.

Turning to FIG. 18, a generalized block diagram illustrating one embodiment of an apparatus 1800 is shown. The apparatus 1800 includes multiple functional blocks or units. In some embodiments, the multiple functional units are individual dies on an integrated circuit (IC), such as a system-on-a-chip (SoC). In other embodiments, the multiple functional units are individual dies within a package, such as a multi-chip module (MCM). In yet other embodiments, the multiple functional units are individual dies or chips on a printed circuit board. The multiple functional blocks or units may each be capable of accessing a shared memory.

In various embodiments, the apparatus 1800 is a SOC that includes multiple types of IC designs on a single semiconductor die, wherein each IC design provides a separate functionality. The IC designs on the apparatus 1800 may also be referred to as functional blocks on the apparatus 1800. Traditionally, each one of the types of IC designs, or functional blocks, has been manufactured on a separate silicon wafer. In the illustrated embodiment, the apparatus 1800 includes multiple IC designs; a fabric 1830 for high-level interconnects and chip communication, a memory interface 1810, and various input/output (I/O) interfaces 1870. Clock sources, such as phase lock loops (PLLs), and a centralized control block for at least power management are not shown for ease of illustration.

The multiple IC designs within the apparatus 1800 include various analog, digital, mixed-signal and radio-frequency (RF) blocks. In the illustrated embodiment, the apparatus 1800 includes one or more processors 1850A-1850D with a supporting cache hierarchy that includes at least cache 1852. In some embodiments, the cache 1852 is a shared level two (L2) cache for the processors 1850A-1850D. In addition, the multiple IC designs include a display controller 1862, a flash memory controller 1864, and a media controller 1866. Further, the multiple IC designs may include a video graphics controller 1840 and one or more processing blocks associated with real-time memory performance for display and camera subsystems, such as camera 1860. In other embodiments, the apparatus 1800 uses other types of processing blocks in addition to or in place of the blocks shown.

In various embodiments, the fabric 1830 provides a top-level interconnect for the apparatus 1800. For example, connections to the cache coherence controller 1832 exist for various requestors within the apparatus 1800. A requestor is one of the multiple IC designs on the apparatus 1800. The cache coherence controller 1832 provides to the multiple IC designs a consistent data value for a given data block in the shared memory, such as off-chip dynamic random access memory (DRAM). The coherence controller 1832 may use a cache coherency protocol for memory accesses to and from the memory interface 1810 and one or more caches in the multiple IC designs on the apparatus 1800.

The memory interface 1810 uses the memory controller 1812 which is not a coherency point within the apparatus 1800 as it is separate from the coherence controller 1832. The interface between the combination of the memory interface 1810 and the coherency controller 1832 and the remainder of the apparatus 1800, which includes the multiple IC designs and the switches 1834 and 1836, includes multiple buses. Asynchronous memory requests, responses, snoops, snoop responses, and input/output (I/O) transactions are visible at this interface with temporal relationships.

The display controller 1862 sends graphics output information that was rendered to one or more display devices. The rendering of the information is performed by the display controller 1862, by the video graphics controller 1840, or by one of the processors 1850A-1850D which is a GPU. Alternatively, the display controller 1862 may send graphics output information to the video graphics controller 1840 to be output to one or more display devices. The graphics output information corresponds to frame buffers accessed via a memory mapping to the memory space of a GPU within the video graphics controller 1840 or within one of the processors 1850A-1850D.

Each one of the processors 1850A-1850D uses one or more cores and one or more levels of a cache memory subsystem. Each core supports the out-of-order execution of one or more threads of a software process and include a multi-stage pipeline. One or more of the processors 1850A-1850D uses circuitry for executing instructions according to a predefined general-purpose instruction set. For example, the PowerPC® instruction set architecture (ISA) may be selected. Alternatively, the ARM®, x86®, x86-64®, Alpha®, MIPS®, PA-RISC®, SPARC® or any other instruction set architecture is selected.

Other processor cores of processors 1850A-1850D have a micro-architecture which provides high instruction throughput for a computational intensive task such as a single instruction multiple data (SIMD) core. Examples of SIMD cores include graphics processing units (GPUs) and digital signal processing (DSP) cores. One or more of the processors 1850A-1850D uses multiple on-die levels (L1, L2, L3 and so forth) of caches for accessing data and instructions. If a requested block is not found in the on-die caches or in the off-die cache 1852, then a read request for the missing block is generated and transmitted to the memory interface 1810 or to on-die flash memory (not shown) controlled by the flash controller 1864. The bus interface unit (BIU) 1854 provides memory access requests and responses for at least the processors 1850A-1850D.

The processors 1850A-1850D share the on-chip flash memory and the off-chip DRAM accessed through the memory interface 1810 with other processing blocks, such as graphics processing units (GPUs), application specific integrated circuits (ASICs), and other types of processor cores. Therefore, typical SOC designs utilize acceleration engines, or accelerators, to efficiently coordinate memory accesses and support coherency transactions between processing blocks and peripherals. In a SOC design that includes multiple processors and processing blocks, these components communicate with each other to control access to shared resources.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
   a memory; and
   a processor coupled to the memory;
   wherein responsive to detecting an update to a mapper entry that corresponds to a given architectural register, the processor is configured to:
      create a new history file entry that identifies an old physical register being replaced with an identification of a new physical register by the update to the mapper entry; and
      store a last reference indicator in the new history file entry, responsive to determining that no other mapper entries reference the old physical register.

2. The system as recited in claim 1, wherein the update is caused by a given instruction being decoded that specifies the given architectural register.

3. The system as recited in claim 2, wherein responsive to determining that there is at least one mapper entry that references the old physical register, the processor is configured to store an indication in the new history file entry that the old physical register is not a last reference.

4. The system as recited in claim 3, wherein responsive to the given instruction being retired, the processor is configured to:
   locate the new history file entry corresponding to the given instruction; and
   prevent the old physical register from being added to a freelist, responsive to detecting the indication that the old physical register is not a last reference.

5. The system as recited in claim 3, wherein responsive to the given instruction being retired, the processor is configured to:
   locate the new history file entry corresponding to the given instruction; and
   add the old physical register to a freelist, responsive to detecting the new history file entry is not marked as a last reference.

6. The system as recited in claim 5, wherein responsive to adding the old physical register to the freelist, the processor is configured to map a second architectural register to the old physical register when a new instruction is executed.

7. The system as recited in claim 2, wherein responsive to a rewind operation of the given instruction being initiated, the processor is configured to:
   locate the new history file entry corresponding to a given instruction that caused the update to the mapper entry;
   retrieve an identifier (ID) of the given architectural register from a destination architectural register field of the new history file entry;
   retrieve an ID of a new physical register from the mapper entry;
   revert the mapper entry to map to the old physical register;
   search for any mapper entries which are mapped to the new physical register; and add the ID of the new physical register to a freelist, responsive to not finding any mapper entries which are mapped to the new physical register.

8. A processor comprising:
a mapper for mapping architectural registers to physical registers;
a history file for storing entries of previous mappings in the mapper;
a freelist for storing identifiers of physical registers that are currently unassigned and available for new mappings; and
a plurality of physical registers;
wherein the processor is configured to:
  detect an update to a mapper entry of a given architectural register; and
  responsive to detecting the update to the mapper entry:
    create a new history file entry that identifies an old physical register being replaced by the update; and
    store a last reference indicator in the new history file entry responsive to determining that no other mapper entries reference the old physical register.

9. The processor as recited in claim 8, wherein the update is caused by a given instruction being decoded, and wherein the given architectural register is specified by the given instruction.

10. The processor as recited in claim 9, wherein responsive to determining that there is at least one entry in the mapper that references the old physical register, the processor is configured to store an indication in the new history file entry that the old physical register is not a last reference.

11. The processor as recited in claim 10, wherein responsive to the given instruction being retired, the processor is configured to:
  locate the new history file entry corresponding to the given instruction; and
  prevent the old physical register from being added to the freelist, responsive to detecting the indication that the old physical register is not a last reference.

12. The processor as recited in claim 10, wherein responsive to the given instruction being retired, the processor is configured to:
  locate the new history file entry corresponding to the given instruction; and
  add the old physical register to the freelist, responsive to detecting the new history file entry is not marked as a last reference.

13. The processor as recited in claim 12, wherein responsive to adding the old physical register to the freelist, the processor is configured to map a second architectural register to the old physical register when a new instruction is executed.

14. The processor as recited in claim 9, wherein responsive to a rewind operation of the given instruction being initiated, the processor is configured to:
  locate the new history file entry corresponding to the given instruction;
  retrieve an identifier (ID) of the given architectural register from a destination architectural register field of the new history file entry;
  retrieve an ID of the new physical register from the mapper entry;
  revert the mapper entry to map to the old physical register;
  search for any mapper entries which are mapped to the new physical register; and
  add the ID of the new physical register to the freelist responsive to not finding any mapper entries which are mapped to the new physical register.

15. A method comprising:
detecting, by a processor, an update to a mapper entry of a given architectural register; and
responsive to detecting the update to the mapper entry:
  creating a new history file entry that identifies an old physical register being replaced by the update; and
  storing a last reference indicator in the new history file entry responsive to determining that no other mapper entries reference the old physical register.

16. The method as recited in claim 15, wherein the update is caused by a given instruction being decoded, and wherein the given architectural register is specified by the given instruction.

17. The method as recited in claim 16, wherein responsive to determining that there is at least one mapper entry that references the old physical register, the method further comprising storing an indication in the new history file entry that the old physical register is not a last reference.

18. The method as recited in claim 17, wherein responsive to the given instruction being retired, the method further comprising:
  locating the new history file entry corresponding to the given instruction; and
  preventing the old physical register from being added to a freelist responsive to detecting the indication that the old physical register is not a last reference.

19. The method as recited in claim 17, wherein responsive to the given instruction being retired, the method further comprising:
  locating the new history file entry corresponding to the given instruction; and
  adding the old physical register to a freelist responsive to detecting the new history file entry is marked as a last reference.

20. The method as recited in claim 19, wherein responsive to adding the old physical register to the freelist, the method further comprising mapping a second architectural register to the old physical register when a new instruction is executed.

* * * * *

UNITED STATES PATENT AND TRADEMARK OFFICE
CERTIFICATE OF CORRECTION

PATENT NO. : 11,200,062 B2  
APPLICATION NO. : 16/551208  
DATED : December 14, 2021  
INVENTOR(S) : Duggal et al.

It is certified that error appears in the above-identified patent and that said Letters Patent is hereby corrected as shown below:

In the Claims

Column 14, Claim 5, Line 49, please delete "file entry is not marked" and insert -- file entry is marked --.

Column 15, Claim 12, Line 45, please delete "file entry is not marked" and insert -- file entry is marked --.

Signed and Sealed this  
First Day of March, 2022

Drew Hirshfeld  
*Performing the Functions and Duties of the*  
*Under Secretary of Commerce for Intellectual Property and*  
*Director of the United States Patent and Trademark Office*